United States Patent
Crowley et al.

(10) Patent No.: US 12,434,018 B2
(45) Date of Patent: Oct. 7, 2025

(54) DRY POWDER MEDICAMENT INHALER

(71) Applicant: NORTON (WATERFORD) LIMITED, Waterfod (IE)

(72) Inventors: Peter John Crowley, Waterford (IE); Jan Geert Hazenberg, County Kilkenny (IE); Daniel Buck, County Waterford (IE); Josh Gottesman, Bristol (GB)

(73) Assignee: NORTON (WATERFORD) LIMITED, Waterford (IE)

( * ) Notice: Subject to any disclaimer, the term of this patent is extended or adjusted under 35 U.S.C. 154(b) by 212 days.

(21) Appl. No.: 17/968,921

(22) Filed: Oct. 19, 2022

(65) Prior Publication Data
US 2023/0095950 A1 Mar. 30, 2023

Related U.S. Application Data

(63) Continuation of application No. PCT/EP2022/077064, filed on Sep. 28, 2022.

(30) Foreign Application Priority Data

Sep. 29, 2021 (GB) .................................. 2113921
Jan. 26, 2022 (GB) .................................. 2200986

(51) Int. Cl.
*A61M 15/00* (2006.01)

(52) U.S. Cl.
CPC .... *A61M 15/0045* (2013.01); *A61M 15/0021* (2014.02); *A61M 15/0063* (2014.02); *A61M 15/0071* (2014.02); *A61M 2202/064* (2013.01)

(58) Field of Classification Search
CPC ..... A61M 15/00–0003; A61M 15/0013–0016; A61M 15/002–0028;
(Continued)

(56) References Cited

U.S. PATENT DOCUMENTS

| 5,239,993 A | 8/1993 | Evans |
| 5,699,789 A | 12/1997 | Hendricks |

(Continued)

FOREIGN PATENT DOCUMENTS

| CN | 101336118 A | 4/2014 |
| EP | 1106196 A2 | 6/2001 |

(Continued)

OTHER PUBLICATIONS

US Food and Drug Administration (FDA) label for ELLIPTA inhaler (Jan. 2019 revision) with image dated Mar. 29, 2021 [retrieved on Jan. 28, 2025] as captured by Internet Archive Wayback Machine. Retrieved from the Internet: <URL: https://web.archive.org/web/20210329042913/https://www.accessdata.fda.gov/drugsatfda_docs/label/2019/204275s017lbl.pdf>.

(Continued)

*Primary Examiner* — Rachel T Sippel
(74) *Attorney, Agent, or Firm* — Morgan, Lewis & Bockius LLP

(57) ABSTRACT

Disclosed are dry powder inhalers for delivering medicament to a user from a blister pack, the blister pack having a plurality of spaced-apart blister pockets containing doses of the medicament. The inhalers comprise: a housing for accommodating unused and used portions of the blister pack together with a dispensing mechanism for selectively opening the blister pockets; and a manifold component through which air can be drawn in use of the inhaler. The manifold component comprises: a primary air inlet opening for receiving first external air; an air outlet opening for providing the external air from the primary air inlet opening into an opened blister pocket, the primary air inlet opening being fluidly connected to the air outlet opening by a primary air delivery conduit formed in the manifold component; a medicament inlet opening for receiving air-entrained medi- (Continued)

cament from the opened blister pocket, the air outlet opening and the medicament inlet opening being arranged side-by-side to enable simultaneous communication with the opened blister pocket; and a medicament outlet opening for delivery of the air-entrained medicament from the opened blister pocket to the user, the medicament inlet opening being fluidly connected to the medicament outlet opening by a medicament delivery conduit formed in the manifold component. The disclosed inhalers embodiments provide a variety of improvements to the design of the manifold component.

26 Claims, 18 Drawing Sheets

(58) Field of Classification Search
CPC . A61M 15/0043–0046; A61M 15/0051–0055; A61M 15/0058–0065; A61M 15/0068–008; A61M 2202/064
See application file for complete search history.

(56) References Cited

U.S. PATENT DOCUMENTS

| | | | |
|---|---|---|---|
| 2002/0066451 A1 | 6/2002 | Davies et al. | |
| 2003/0075172 A1 | 4/2003 | Johnson et al. | |
| 2005/0154491 A1 | 7/2005 | Anderson et al. | |
| 2006/0196504 A1* | 9/2006 | Augustyn | A61M 15/0045 128/203.15 |
| 2009/0314291 A1* | 12/2009 | Anderson | A61M 15/007 128/203.15 |
| 2020/0324064 A1 | 10/2020 | Huang et al. | |
| 2021/0386945 A1* | 12/2021 | Ahern | A61M 15/0051 |

FOREIGN PATENT DOCUMENTS

| | | |
|---|---|---|
| EP | 0634184 B1 | 10/2001 |
| EP | 1844806 A1 | 10/2007 |
| EP | 2082760 A1 | 7/2009 |
| EP | 2082764 A1 | 7/2009 |
| EP | 2082769 B1 | 7/2009 |
| EP | 2198907 A1 | 6/2010 |
| EP | 3856303 A1 | 8/2021 |
| GB | 2242134 A | 9/1991 |
| GB | 2407042 A | 4/2005 |
| JP | H09248342 A | 9/1997 |
| JP | 2000217920 A | 8/2000 |
| JP | 2001070403 A | 3/2001 |
| JP | 2014140755 A | 8/2014 |
| WO | 03/061744 A1 | 7/2003 |
| WO | 2005/014089 A1 | 2/2005 |
| WO | 2006/018261 A1 | 2/2006 |
| WO | 2006/066909 A1 | 6/2006 |
| WO | 2006/066910 A1 | 6/2006 |
| WO | 2007/012871 A1 | 2/2007 |
| WO | 2007/068896 A1 | 6/2007 |
| WO | 2007/068900 A2 | 6/2007 |
| WO | 2007/129127 A1 | 11/2007 |
| WO | 2009/092520 A1 | 7/2009 |
| WO | 2010/040779 A2 | 4/2010 |
| WO | 2010/133321 A1 | 11/2010 |
| WO | 2010/133323 A1 | 11/2010 |
| WO | 2010/135253 A2 | 11/2010 |
| WO | 2010/135340 A2 | 11/2010 |
| WO | 2010/136134 A1 | 12/2010 |
| WO | 2011/067212 A2 | 6/2011 |
| WO | 2011/129785 A1 | 10/2011 |
| WO | 2011/129790 A1 | 10/2011 |
| WO | 2015/006838 A1 | 1/2015 |
| WO | 2018/094392 A1 | 5/2018 |
| WO | 2020/025977 A1 | 2/2020 |
| WO | 2020/053878 A1 | 3/2020 |
| WO | 2021/099328 A1 | 5/2021 |
| WO | 2021/195353 A1 | 9/2021 |

OTHER PUBLICATIONS

US Food and Drug Administration (FDA) label for DISKUS inhaler (Jan. 2019 revision) with image dated Sep. 1, 2020 [retrieved on Jan. 28, 2025] as captured by Internet Archive Wayback Machine. Retrieved from the Internet: <URL: https://web.archive.org/web/20200901125555/https://www.accessdata .fda.gov/drugsaffdadocs/label/2019/021077s061 lbl.pdf>.

Facebook post by GSK, manufacturer of Ellipta inhaler, dated Oct. 2, 2017 [retrieved Jan. 24, 2025]. Retrieved from the Internet: <URL: https://www.facebook.com/GSK/posts/four-years-ago-we-first-launchedthe-first-ellipta-inhaler-now-weve-just-made-th/1457658254303123/>.

Images from YouTube website (p. 1) and screenshots (pp. 2 and 3) from the video "How to use an Ellipta Inhaler" by Boston Children's Hospital; video upload date Jun. 4, 2019; [retrieved Jan. 24, 2025] Retrieved from the internet <URL:https://www.youtube.com/watch?v=E6XOzW4HQLk> with image dated May 1, 2021 (p. 4) as captured from Internet Archive Wayback Machine [retrieved Jan. 28, 2025] Retrieved from the internet <URL: : https://web.archive.org/web/20210501155031/https://www.youtube.com/watch?v=E6X0zW4HQLk.

"The Diskus ™: a review of its position among dry powder inhaler devices", H. Chrystyn, The International Journal of Clinical Practice, Jun. 2007, 61, 6, pp. 1022-1036 DOI: 10.1111/j.1742 1241. 2007.01382.x; first published May 10, 2007.

Images of Diskus inhaler product (undated).

US Food and Drug Administration (FDA) label for Wixela Inhub (Jan. 2019 revision) with image dated Jul. 14, 2020 [retrieved on Jan. 28, 2025] as captured by Internet Archive Wayback Machine. Retrieved from the Internet: <URL: https://web.archive.org/web/20200714130253/hftps://www.accessdata.fda.gov/drugsaffda_ docs/label/2019/208891 Orig1 s000lbl.pdf>.

Mylan news release about Wixela Inhub (dated Jan. 31, 2019) [retrieved on Feb. 7, 2025]. Retrieved from the Internet: <URL: https ://investor.mylan.com/news-releases/news-release-details/mylanannounces-fda-approval-wixelatm-inhubtm-fluficasone> with image dated Oct. 1, 2020 as captured by Internet Archive Wayback Machine. Retrieved from Internet: <URL: https://web.archive.org/web/20201001043209/https://investor.mylan.com/news-releases/news-release-details/mylan-announces-fda-approvalwixelatm-inhubtm-fluficasone>.

Images from YouTube website (p. 1) and screenshots (pp. 2 and 3) from the video "Wixela Inhaler" by COPD Foundation; video upload date May 2, 2019; [retreived Jan. 24, 2025] Retrieved from the Internet <URL: https://www.youtube.com/watch?v=n-AdzaPEpxE> with image dated Apr. 14, 2021 (p. 4) as captured from Internet Archive Wayback Machine [retrieved Jan. 28, 2025] Retrieved from the Internet <URL: https://web.archive.org/web/20210414173052/hftps://www.youtube.com/watch?v=n-AdzaPEpxE>.

* cited by examiner

DRY POWDER MEDICAMENT INHALER

CROSS REFERENCE TO RELATED APPLICATIONS

This application is a continuation of International Patent Application No. PCT/EP2022/077064, filed Sep. 28, 2022, which claims priority to GB Patent Application No. 2200986.4 filed Jan. 26, 2022 and GB Patent Application No. 2113921.7 filed Sep. 29, 2021, each of which is hereby incorporated by reference in its entirety.

FIELD OF THE INVENTION

This invention relates to a dry powder inhaler. In particular, this invention relates to a dry powder inhaler for delivering medicament from at least one elongate blister pack, wherein the blister pack has a plurality of spaced-apart blister pockets containing doses of the medicament.

BACKGROUND OF THE INVENTION

Inhalers for drug delivery to a user by inhalation are well-known. Such devices include metered-dose inhalers and dry powder inhalers.

Metered dose inhalers typically comprise a container containing a propellant and a liquid solution or suspension of a medicament. Metered dose inhalers further include a dispensing valve which, when actuated, causes the medicament to be forced out of the container by expansion of the propellant in the form of an aerosol.

Dry powder inhalers, on the other hand, typically comprise a supply of the medicament in dry powder form, and are arranged to permit the user to inhale discrete doses from the supply of powder medicament.

Some dry powder inhalers comprise a bulk reservoir of powder medicament, with a dispensing mechanism being configured to separate a dose of the medicament from the reservoir and make it available for inhalation by the user. Other types of dry powder inhaler comprise a plurality of pre-metered doses of powder medicament in containers, for example in capsules or blisters, and a dispensing mechanism which is configured to open the containers and make the doses of medicament available for inhalation by the user.

One such type of dry powder inhaler comprises a medicament carrier in the form of a blister pack having a plurality of spaced-apart blister pockets containing doses of the medicament. The inhaler comprises a manually-operated dispensing mechanism for moving a medicament dose of the medicament carrier to a dispensing position in the inhaler, and for placing the medicament dose in fluid communication with an air flow path of the inhaler, for example by piercing or peeling open the blisters, ready for inhalation by the user.

An inhaler of this type is described in GB 2242134 A. The dispensing mechanism of this device is operated by a lever, which causes a blister to be moved to the dispensing position of the inhaler and peeled open. Another inhaler of this type is described in WO 2007/068896 A1. The dispensing mechanism of this inhaler is operated by a rotatable mouthpiece cover, the opening of which causes a blister to be moved to the dispensing position of the inhaler and peeled open.

Dry powder inhalers of the type described above may comprise a manifold component which defines a part of an air flow path through the inhaler. In particular, the manifold is arranged to direct air (through an air conduit) from an air inlet of the inhaler to the opened blisters, and to direct air-entrained medicament (through a medicament delivery conduit) from the opened blisters to a mouthpiece of the inhaler. Inhalation-induced air flow through the manifold causes the medicament in the opened blisters to be entrained by the air, which flows through the opened blisters, and across the medicament, so that the air-entrained medicament can be inhaled by the user. By way of example, WO 2007/068896 A1 discloses a manifold of this type in which an air bypass hole is provided so that a bleed air flow disruptively impacts the flow of air-entrained medicament.

The present inventors have recognised that, although the operation of the above-described dry powder inhalers may be satisfactory, there is scope to provide improvements, in particular in relation to the design of the manifold component. There is in particular a need for manifold component designs that are able to provide improved control over the air flow through the medicament, and hence the entrainment of the medicament in the air. It is an object of embodiments of the present invention to provide such improvements.

SUMMARY OF THE INVENTION

A first aspect of the invention provides a dry powder inhaler for delivering medicament to a user from at least one blister pack, the blister pack having a plurality of spaced-apart blister pockets containing doses of the medicament. The inhaler comprises: a housing for accommodating unused and used portions of the blister pack together with a dispensing mechanism for selectively opening the blister pockets; and a manifold component through which air can be drawn in use of the inhaler.

The manifold component comprises:
a primary air inlet opening for receiving first external air;
an air outlet opening for providing the first external air from the primary air inlet opening into an opened blister pocket, the primary air inlet opening being fluidly connected to the air outlet opening by a primary air delivery conduit formed in the manifold component;
a medicament inlet opening for receiving air-entrained medicament from the opened blister pocket, the air outlet opening and the medicament inlet opening being arranged side-by-side to enable simultaneous communication with the opened blister pocket; and
a medicament outlet opening for delivery of the air-entrained medicament from the opened blister pocket to the user, the medicament inlet opening being fluidly connected to the medicament outlet opening by a medicament delivery conduit formed in the manifold component.

The primary air delivery conduit and the medicament delivery conduit are independent of each other and not directly connected.

According to the invention, the manifold component further comprises an auxiliary air inlet opening for receiving second external air and an auxiliary air delivery conduit fluidly connecting the auxiliary air inlet opening to the medicament delivery conduit such that, in use of the inhaler, the air-entrained medicament flowing through the medicament delivery conduit is disruptively impacted by the second external air from the auxiliary air delivery conduit. The primary air inlet opening and the auxiliary air inlet opening are independent of each other.

The first aspect of the invention provides an improvement to the auxiliary air delivery conduit, which in the prior art is configured as a simple bypass air flow path in which air from the primary air delivery conduit bypasses the opened blister pocket and flows directly into the medicament delivery conduit. By providing the auxiliary air delivery conduit with its own air inlet opening for receiving external air (i.e. the auxiliary air inlet opening), the airflow passing through the auxiliary air delivery conduit can be controlled and adjusted (i.e. tuned) independently of the airflow passing through the opened blister pocket. Such an arrangement allows for the respective airflows to be optimised for any given medicament formulation.

Such an arrangement also provides for a constant airflow resistance of the airflow path through the auxiliary air delivery conduit, regardless of the amount of medicament remaining in the opened blister pocket. In this way, the performance of the manifold component, and in particular the provision of auxiliary air for disruptively impacting the air-entrained medicament flowing through the medicament delivery conduit, can be made more consistent throughout use of the inhaler (i.e. throughout the user's inhalation of a dose of the medicament).

In some embodiments, the auxiliary air delivery conduit may be arranged to receive air exclusively from the auxiliary air inlet opening, so that the first external air and the second external air do not mix upstream of the medicament delivery conduit.

In other embodiments, the auxiliary air delivery conduit is also fluidly connected to the primary air delivery conduit, such that the auxiliary air delivery conduit is arranged to receive the first external air from the primary air inlet opening and the second external air from the auxiliary air inlet opening, wherein the first external air and the second external air mixes in the auxiliary air delivery conduit. Such an arrangement may provide for even greater design flexibility, in that the first and second external air can be blended for use as auxiliary air.

In any of the above-identified embodiments, the auxiliary air delivery conduit may extend in a direction that is substantially perpendicular to that of the medicament delivery conduit. It has been found that such a relationship can maximise the disruptive effect of the auxiliary air flow, so that the air-entrained medicament is not only well de-agglomerated but also thoroughly mixed before it is inhaled.

A second aspect of the invention provides a dry powder inhaler for delivering medicament to a user from at least one blister pack, the blister pack having a plurality of spaced-apart blister pockets containing doses of the medicament. The inhaler comprises: a housing for accommodating unused and used portions of the blister pack together with a dispensing mechanism for selectively opening the blister pockets; and a manifold component through which air can be drawn in use of the inhaler.

The manifold component comprises:

an air inlet opening for receiving external air;

an air outlet opening for providing the external air from the air inlet opening into an opened blister pocket, the air inlet opening being fluidly connected to the air outlet opening by an air delivery conduit formed in the manifold component;

a medicament inlet opening for receiving air-entrained medicament from the opened blister pocket, the air outlet opening and the medicament inlet opening being arranged side-by-side to enable simultaneous communication with the opened blister pocket; and a medicament outlet opening for delivery of the air-entrained medicament from the opened blister pocket to the user, the medicament inlet opening being fluidly connected to the medicament outlet opening by a medicament delivery conduit formed in the manifold component.

According to the invention, the air outlet opening is arranged to be positioned substantially centrally over the opened blister pocket, and the medicament inlet opening is arranged to be positioned over the opened blister pocket so as to be closer to an edge of the opened blister pocket than the air outlet opening.

Such an arrangement is able to provide for more complete emptying of the medicament from the opened blister pocket. In particular, the provision of the medicament inlet opening close to the edge of the blister pocket can help to prevent medicament being retained at the edge of the blister pocket. In this way, medicament dosing may be more consistent and medicament wastage minimised.

In embodiments, the medicament inlet opening at least partially surrounds the air outlet opening, and optionally the medicament inlet opening may defines an angle of at least 180 degrees, optionally at least 200 degrees, further optionally at least 220 about the air outlet opening.

The air outlet opening may have a circular or elongate shape, which may correspond to the shape of the blister pockets. The medicament inlet opening may have a curved or arcuate shape, for example surrounding the air outlet opening, and at least partially corresponding to the shape of the blister pockets.

In any of the above-identified embodiments, the medicament inlet opening may be divided into a plurality of adjacent openings each arranged to be positioned over a peripheral region of the opened blister pocket. Such an arrangement may be used, instead of a relatively large single medicament inlet, to control the rate at which the medicament is entrained by the airflow.

A third aspect of the invention provides a dry powder inhaler for delivering medicament to a user from at least one blister pack, the blister pack having a plurality of spaced-apart blister pockets containing doses of the medicament. The inhaler comprises: a housing for accommodating unused and used portions of the blister pack together with a dispensing mechanism for selectively opening the blister pockets; and a manifold component through which air can be drawn in use of the inhaler.

The manifold component comprises:

a medicament inlet opening arranged to be positioned over the opened blister pocket for receiving medicament from the opened blister pocket;

a medicament outlet opening for delivery of air-entrained medicament from the opened blister pocket to the user; and a medicament delivery conduit formed in the manifold component, the medicament inlet opening and the medicament outlet opening being arranged at opposite ends of the medicament delivery conduit, and the medicament delivery conduit defining a substantially circular chamber extending in the medicament flow direction.

According to the invention, the manifold component further comprises at least one air delivery conduit fluidly connecting an external air inlet opening to the medicament delivery conduit. Further, the or each air delivery conduit is arranged to, in use of the inhaler, direct the air from the external air inlet opening into the chamber of the medicament delivery conduit in a direction that is substantially tangential to the chamber and at a position adjacent the medicament inlet opening, such that the tangential air flow forms a low pressure vortex in the chamber for drawing the medicament through the medicament inlet opening and mixing the medicament with the air.

Such an arrangement may avoid the prior art requirement for the manifold component to have an air outlet opening through which external air flows into the opened blister pocket. In particular, the low pressure vortex pulls the medicament from the blister pocket and through the medicament inlet opening, and the helical nature of the air flow helps to entrain the medicament in the air and de-agglomerate the medicament. Accordingly, embodiments may be provided in which the manifold component has no air outlet opening through which external air is able to flow into the opened blister pocket. However, the manifold component of alternative embodiments may still be provided such an air outlet opening, in which case the low pressure vortex may assist in drawing the medicament through the medicament inlet opening and mixing the medicament with the air.

The manifold component may comprises at least two of the air delivery conduits circumferentially spaced around the chamber of the medicament delivery conduit. For example, the manifold component may comprise two and only two of the air delivery conduits at diametrically opposite sides of the chamber of the medicament delivery conduit. Alternative embodiments may comprise three and only three air delivery conduits, for example at 120 degree spacings, around the chamber or four and only four air delivery conduits, for example at 90 degree spacings.

Each air delivery conduit may be arranged tangentially in relation to the chamber of the medicament delivery conduit.

In embodiments, the medicament inlet opening may be divided into a plurality of adjacent openings each arranged to be positioned over the opened blister pocket. In this way, an area of the opened blister pocket that is exposed to the low pressure vortex may be increased.

A fourth aspect of the invention provides a dry powder inhaler for delivering medicament to a user from at least one blister pack, the blister pack having a plurality of spaced-apart blister pockets containing doses of the medicament. The inhaler comprises: a housing for accommodating unused and used portions of the blister pack together with a dispensing mechanism for selectively opening the blister pockets; and a manifold assembly through which air can be drawn in use of the inhaler.

The manifold assembly comprises:

an air inlet opening for receiving external air;

an air outlet opening for providing the external air from the air inlet opening into an opened blister pocket, the air inlet opening being fluidly connected to the air outlet opening by an air delivery conduit formed in the manifold assembly;

a medicament inlet opening for receiving air-entrained medicament from the opened blister pocket, the air outlet opening and the medicament inlet opening being arranged side-by-side to enable simultaneous communication with the opened blister pocket; and a medicament outlet opening for delivery of the air-entrained medicament from the opened blister pocket to the user, the medicament inlet opening being fluidly connected to the medicament outlet opening by a medicament delivery conduit formed in the manifold assembly.

According to the invention, the medicament inlet opening, the medicament outlet opening and the medicament delivery conduit of the manifold assembly are provided as a unitary moulded plastics component.

In this way, leakage of medicament as it passes through these parts of the manifold assembly can be eliminated. In particular, the provision of these parts as a unitary moulded plastics component avoids any joins or seams through which the medicament may otherwise leak. This provides for more consistent medicament dosing, minimises medicament wastage, and avoids contamination of the internal mechanisms of the inhaler.

The dry powder inhaler may further comprising a mouthpiece for contacting the user's mouth and through which the user is able to inhale the air-entrained medicament from the opened blister pocket. In this case, the mouthpiece may be further provided by the unitary moulded plastics component that also provides the medicament inlet opening, the medicament outlet opening and the medicament delivery conduit of the manifold assembly. In this way, leakage of the medicament from as it passes from the medicament delivery conduit to the mouthpiece may also be avoided.

In a particular embodiment, the unitary moulded plastics component is a first unitary moulded plastics component, and the an air inlet opening, the air outlet opening and the air delivery conduit of the manifold assembly are provided as a second unitary moulded plastics component. The first unitary moulded plastics component and the second unitary moulded plastics component may be assembled and joined together, optionally by welding.

A fifth aspect of the invention provides a dry powder inhaler for delivering medicament to a user from at least one blister pack, the blister pack having a plurality of spaced-apart blister pockets containing doses of the medicament. The inhaler comprises: a housing for accommodating unused and used portions of the blister pack together with a dispensing mechanism for selectively opening the blister pockets; and a manifold component through which air can be drawn in use of the inhaler.

The manifold component comprises:

an air inlet opening for receiving external air;

an air outlet opening for providing the external air from the air inlet opening into an opened blister pocket;

a medicament inlet opening for receiving air-entrained medicament from the opened blister pocket, the air outlet opening and the medicament inlet opening being arranged side-by-side to enable simultaneous communication with the opened blister pocket; and a medicament outlet opening for delivery of the air-entrained medicament from the opened blister pocket to the user, wherein the air inlet opening and the medicament outlet opening are arranged at opposite ends of a medicament delivery chamber formed in the manifold component and defining an air flow path through the medicament delivery chamber, the air outlet opening and the medicament inlet opening being arranged in the medicament delivery chamber between the air inlet opening and the medicament outlet opening, and wherein the medicament delivery chamber is provided with at least one deflection baffle that is spaced away from the air outlet opening and the medicament inlet opening, the deflection baffle being arranged to deflect air flowing from the air inlet opening to the medicament outlet opening so that, in use of the inhaler, the deflected air is diverted through the opened blister pocket, via the air outlet opening and the medicament inlet opening, and the diverted air entrains the medicament in the opened blister pocket.

For example, the deflection baffle may defines an oblique surface for directing the air flowing through the medicament delivery chamber into the opened blister pocket, via the air outlet opening, for entraining the medicament in the opened blister pocket.

Such an arrangement provides for the medicament to be extracted by a variety of mechanisms. For example, the deflection baffle, or a further baffle being spaced away from the air outlet opening and the medicament inlet opening, may be arranged to create a low pressure region in the medicament delivery chamber adjacent to the medicament inlet opening, for drawing the air-entrained medicament from the opened blister pocket, via the medicament inlet opening.

A sixth aspect of the invention provides a dry powder inhaler for delivering medicament to a user from at least one blister pack, the blister pack having a plurality of spaced-apart blister pockets containing doses of the medicament. The inhaler comprises: a housing for accommodating unused and used portions of the blister pack together with a dispensing mechanism for selectively opening the blister pockets; and a manifold component through which air can be drawn in use of the inhaler.

The manifold component comprises:

an air inlet opening for receiving external air;

a medicament inlet opening for receiving medicament from the opened blister pocket, and a medicament outlet opening for delivery of air-entrained medicament from the opened blister pocket to the user, wherein the air inlet opening and the medicament outlet opening are arranged at opposite ends of a medicament delivery conduit formed in the manifold component and defining an air flow path through the medicament delivery conduit, the medicament inlet opening being arranged in a side wall of the medicament delivery conduit between the air inlet opening and the medicament outlet opening, and wherein the medicament inlet opening is provided at a constricted section of the medicament delivery conduit, such that, in use of the inhaler, the Venturi effect provides for a low pressure region adjacent to the medicament inlet opening for drawing the medicament from the opened blister pocket into the medicament delivery conduit, and the drawn in medicament is then entrained by the air flowing through the medicament delivery conduit from the air inlet opening to the medicament outlet opening.

Such an arrangement may avoid the prior art requirement for the manifold component to have an air outlet opening through which external air flows into the opened blister pocket. In particular, the low pressure region pulls the medicament from the blister pocket and through the medicament inlet opening. Accordingly, embodiments may be provided in which the manifold component has no air outlet opening through which external air is able to flow into the opened blister pocket. However, the manifold component of alternative embodiments may still be provided such an air outlet opening, in which case the low pressure region may assist in drawing the medicament through the medicament inlet opening.

In embodiments, the medicament inlet opening may be divided into a plurality of adjacent openings each arranged to be positioned over the opened blister pocket.

The constricted section of the medicament delivery conduit defines a cross-sectional area that is at least 30%, optionally at least 50%, smaller than each of an upstream and downstream cross-sectional area of the medicament delivery conduit. In this way, the low pressure region adjacent the medicament inlet opening may be more effective for drawing the medicament from the opened blister pocket.

In embodiments, the medicament delivery conduit may be provided with fins or baffles downstream of the constricted section for disrupting the airflow through the medicament delivery conduit, to thereby improve mixing of the air-entrained medicament. The fins or baffles may be arranged at oblique angles for creating a vortex air flow.

In any aspect of the invention, the manifold component, or the unitary moulded plastics components of the manifold assembly, may be formed of a material selected from the group consisting of: polyolefins, including polyethylene, in particular high density polyethylene (HDPE), and polypropylene; polyesters, including polyethylene terephthalate; polyamides, including nylons; thermosetting polymers, including urea-formaldehyde, melamine, epoxy resins and polyimides; and mixtures or copolymers thereof.

In any aspect of the invention, the air inlet opening or openings may define the only points of entry for external air into the manifold component, and optionally into the dry powder inhaler.

In any aspect of the invention, the medicament delivery conduit or the medicament delivery chamber may have a circular cross-section. Optionally, the medicament delivery conduit or the medicament delivery chamber may taper along its length with an increasing cross sectional area in the direction of air flow.

In any aspect of the invention, the dispensing mechanism may configured for opening at least two blister pockets at a time, and the manifold component or manifold assembly may further comprise a second medicament inlet opening for receiving medicament from the second opened blister pocket, the second medicament inlet being fluidly connected to the medicament delivery conduit or chamber.

The manifold component or manifold assembly may further comprise a second air outlet opening for providing air to a second opened blister pocket, the second air outlet opening being fluidly connected to the air delivery conduit, and the second air outlet opening and the second medicament inlet opening being arranged side-by-side to enable simultaneous communication with the second opened blister pocket.

Such an embodiment is suitable for combination therapy in which two different medicaments are simultaneously delivered from respective opened blister pockets, for example where the different medicaments are not suitable for being stored together. The same principle can be used to simultaneously deliver three or more different medicaments.

The different medicaments may be delivered from different blister pockets of the same blister pack or from respective blister pockets of different blister packs. Where a single blister pack is provided, the dispensing mechanism may be configured to simultaneously open at least two blister pockets at a time. Where two (or more) blister packs are provided, the dispensing mechanism may be configured to simultaneously open a blister pocket of each blister pack.

In any aspect of the invention, the dry powder inhaler may include the dispensing mechanism. The dispensing mechanism may comprises a peeling mechanism arranged to open the blister pockets by peeling a cover layer of the or each blister pack from a base layer of the or each blister pack. The dispensing mechanism may comprise an indexing mechanism arranged to move the or each blister pack so that the or each opened blister pocket is aligned with the air outlet and the medicament inlet openings.

In any aspect of the invention, the dry powder inhaler may include the blister pack or blister packs, wherein the or each blister pack comprises an elongate base layer defining spaced-apart blister pockets containing medicament doses, and a cover layer adhesively bonded to the base layer to close the blister pockets, and wherein the cover layer is arranged to be peeled from the base layer.

The blister pockets contain medicaments for treating respiratory diseases such as asthma and COPD, for example selected from budesonide, formoterol, beclomethasone, fluticasone, salmeterol, albuterol, salbutamol, indacaterol, tiotropium, ipratropium, glycorpyrronium, umeclidinium, vilanterol, and combinations thereof.

BRIEF DESCRIPTION OF THE DRAWINGS

Embodiments of the invention will now be described in more detail and by way of non-limiting examples with reference to the accompanying drawings, in which.

DETAILED DESCRIPTION OF THE EMBODIMENTS

Figure 1:
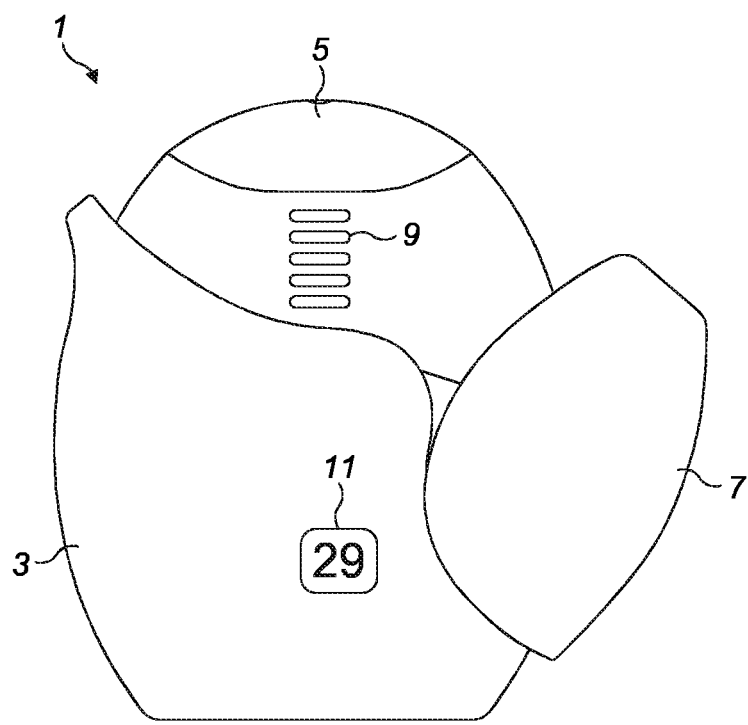
FIG. 1 is a perspective view of a dry powder inhaler according to an embodiment of the first aspect of the invention.

It should be understood that the detailed description, while indicating exemplary embodiments of the inventive dry powder inhaler, are intended for the purposes of illustration only and are not intended to limit the scope of the invention. Features, aspects, and advantages of the inhaler will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a dry powder inhaler for delivering medicament from at least one blister pack, each blister pack having a plurality of spaced-apart blister pockets containing doses of the medicament. The inhaler comprises a housing for accommodating unused and used portions of the at least one blister pack together with a dispensing mechanism for simultaneously opening at least one blister pockets at a time; the inhaler also comprises a manifold component through which air can be drawn in use of the inhaler.

The manifold component comprises: an air inlet opening for receiving external air; a medicament inlet opening for receiving air-entrained medicament from the opened blister pocket; and a medicament outlet opening for delivery of the air-entrained medicament from the opened blister pocket to the user. The medicament inlet opening is fluidly connected to the medicament outlet opening by a medicament delivery conduit or chamber formed in the manifold component. The air inlet opening may be fluidly connected to the medicament delivery conduit or chamber in a variety of ways, directly and/or indirectly via the opened blister pocket. Different aspects of the invention provide a variety of improvements to the design of the manifold component.

Figure 2:
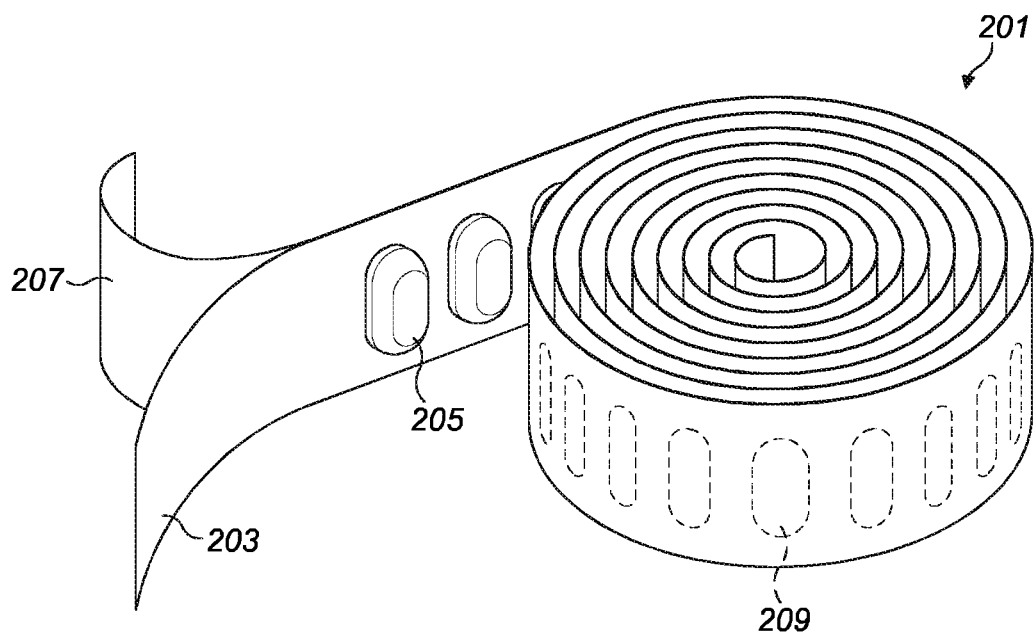
FIG. 2 is a perspective view of a medicament carrier for use in the dry powder inhaler shown in FIG. 1.
Figure 3:
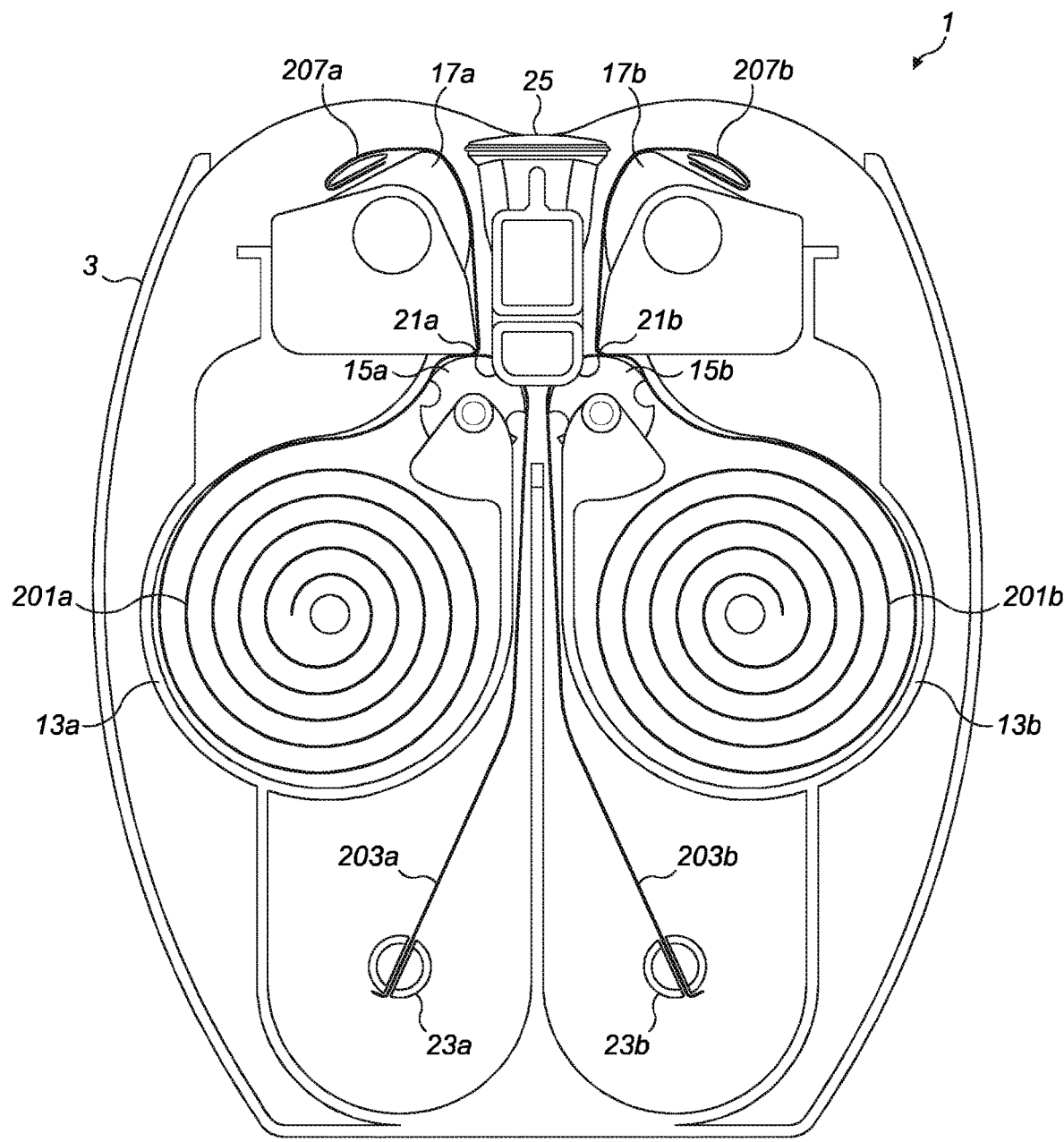
FIG. 3 is a view of the inhaler shown in FIG. 1 with certain components removed and including a pair of the medicament carriers shown in FIG. 2 installed.
Figure 4:
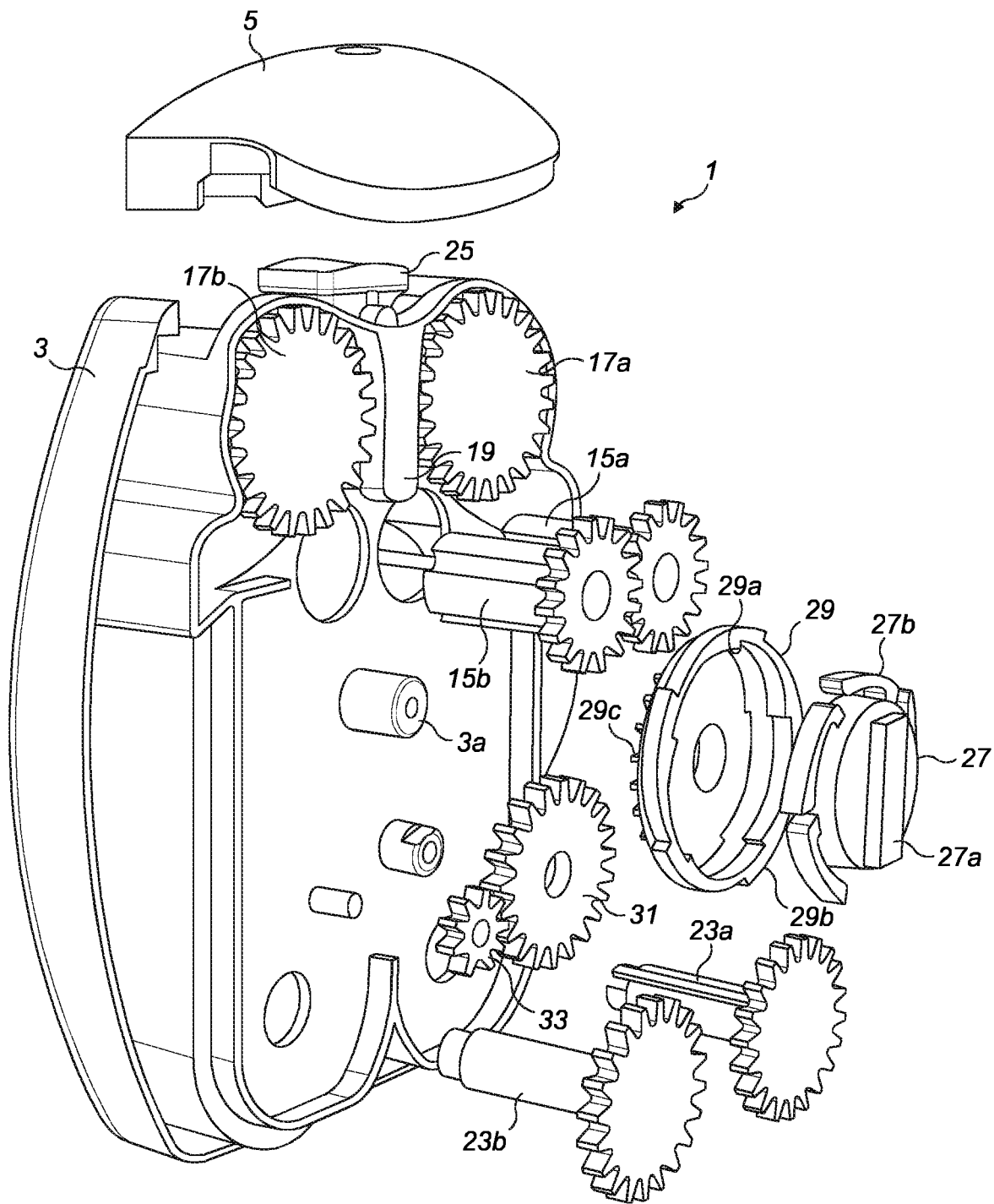
FIG. 4 is an exploded perspective view of the inhaler shown in FIG. 1 with certain components removed, from the opposite direction.

FIGS. 1, 3 and 4 show a dry powder inhaler 1 according to a non-limiting embodiment of the first aspect of the invention. FIG. 2 shows a medicament carrier 201 for use with the inhaler 1. A dry powder inhaler using the same type of medicament carrier and having a manifold component is described in WO 2007/068896 A1, the entire contents of which is incorporated herein by reference.

As shown in FIG. 1, the inhaler 1 is a hand-held device having a substantially flat or planar shape with a rounded outer profile. The outer profile of the inhaler is mainly defined by its housing 3 which encloses its internal components and receives at least one medicament carrier 201 (not shown in FIG. 1 but shown in FIGS. 2 and 3). Extending from the housing 3 is a mouthpiece component 5 having a central opening through which the user inhales the powder medicament. The mouthpiece component 5 is assembled or joined to the housing 3.

The inhaler also comprises a mouthpiece cover 7, which is rotatably connected to the housing 3 for sequential movement about a rotation axis from a first position in which the mouthpiece 5 is completely covered to a second position in which the mouthpiece 5 is also completely covered, and from the second position to a third position in which the mouthpiece 5 is completely uncovered. FIG. 1 shows the mouthpiece cover 7 in its third position.

Also visible in FIG. 1 is an air inlet 9 and a dose counter display 11. The air inlet 9, which can be covered by the mouthpiece cover 7, defines the start of an air flow path that extends from the air inlet 9 to the central opening of the mouthpiece 5. The dose counter display 11 is coupled to a dispensing mechanism of the inhaler 1, to be described subsequently, so as to provide an indication of the number of medicament doses used or remaining in the inhaler 1.

FIG. 2 shows a medicament carrier 201 for use with the inhaler 1 shown in FIG. 1. The medicament carrier 201 is in the form of an elongate blister strip. The blister strip comprises a semi-rigid base layer 203 which is formed with spaced-apart blister openings 205 and more flexible cover layer 207 which covers the blister openings 205 to define spaced-apart blisters 209. The blisters 209 each contain a sealed dose of powder medicament.

The cover layer 207 of the medicament carrier 201 is adhesively bonded to the base layer 203 such that the layers 203, 207 can be peeled apart to open the blisters 209 and liberate the powder medicament without any risk of either layer 203, 207 breaking. The base layer 203 and the cover layer 207 typically comprise plastics/aluminium laminates and are adhesively bonded by a heat seal lacquer. A suitable medicament carrier is described in more detail in WO 2007/068896 A1.

The inhaler 1 shown in FIG. 1 is designed for use with a pair (i.e. two) of the medicament carriers 201 shown in FIG. 2, as will now be described with reference to FIG. 3. It is to be noted, however, that embodiments according to the invention may be used with, or comprise, any number of the medicament carriers 201, including just one.

FIG. 3 is a view of the inhaler 1 shown in FIG. 1 with certain components removed and including a pair of the medicament carriers 201a, 201b installed. In particular, the mouthpiece 5, mouthpiece cover 7, and part of the housing 3 have been removed to reveal a remaining part of the housing 3 and the medicament carriers 201a, 201b (shown in schematic form, without all of the blisters), as well as a manifold component 25, to be described subsequently, and parts of the dispensing mechanism. As shown in the drawing, the housing 3 provides regions 13a, 13b for accommodating unused portions of the medicament carriers 201a, 201b, which are loosely-coiled. Regions are also provided for accommodating used portions of the medicament carriers 201a, 201b, as will be described below. It is noted that the internal arrangement of the inhaler 1 is generally symmetrical, with one medicament carrier 201a being accommodated on one side (left side in the drawing) and the other medicament carrier 201b being accommodated on the other side (right side in the drawing).

The dispensing mechanism, which is only partly shown in FIG. 3, comprises an indexing wheel 15a, 15b and a peeling spool 17a, 17b for each of the medicament carriers 201a, 201b. Each medicament carrier 201a, 201b is fed around its respective indexing wheel 15a, 15b with the base layer 203a, 203b having the blisters facing the indexing wheel 15a, 15b. The indexing wheels 15a, 15b are provided with a plurality of recesses about their circumference which are sized and positioned to receive the blisters of the medicament carrier 201a, 201b. When the index wheels 15a, 15b are rotatably driven by the dispensing mechanism, they engage the medicament carriers 201a, 201b, in particular their semi-rigid blisters, so that the next medicament-containing blister of each medicament carrier 201a, 201b can be advanced to a dispensing position of the inhaler 1 (adjacent the manifold component 25, at which the medicament is to be presented for inhalation).

Simultaneously, a leading end of the cover layer 207a, 207b of each medicament carrier 201a, 201b is separated from its base layer 203a, 203b and fed around a peeling edge 21a, 21b, which is positioned between used portions of the cover layer 207a, 207b and the base layer 203a, 203b. For this purpose, the leading end of the cover layer 207a, 207b of each medicament carrier 201a, 201b is attached to a respective peeling spool 17a, 17b. The peeling spools 17a, 17b are rotatably driven at the same time as the indexing wheels 15a, 15b, and this causes each cover layer 207a, 207b to be gradually peeled away from its base layer 203a, 203b at the peeling edge 21a, 21b, so that the medicament-containing blister 209a, 209b is opened for inhalation by the user.

As medicament doses are dispensed from the inhaler 1, used portions of the cover layers 207a, 207b are wound onto the peeling spools 17a, 17b. Used portions of the base layers 203a, 203b are accommodated in a separate region of the housing where they are coiled up by rotatably-driven coiling spools 23a, 23b. By way of example, the medicament carriers 201a, 201b may each comprise 60 doses of a powder medicament, with a dose from each carrier being dispensed simultaneously.

The manifold component 25 and the remaining parts of the dispensing mechanism of the inhaler 1 will now be described with reference to FIG. 3 and FIG. 4, which is an exploded perspective view of the inhaler shown in FIG. 1 with certain components removed. It is to be noted that FIG. 4 shows an opposite side of the inhaler to that shown in FIG. 3, i.e. FIG. 4 shows the back side of the inhaler 1. In FIG. 4, the mouthpiece cover 7, and part of the housing 3 have been removed to reveal a remaining part of the housing 3 and remaining parts of the dispensing mechanism. FIG. 4 also shows the mouthpiece 5 and part of the manifold component 25.

The manifold component 25 shown in FIGS. 3 and 4 is a unitary moulded plastics component arranged in the housing 3 and which defines an air flow path extending from the air inlet 9 (FIG. 1) to the mouthpiece 5, with which it interfaces. When a user inhales through the mouthpiece 5, air is drawn in to the air inlet 9, through the air flow path, and out through the mouthpiece 5. The manifold component 25 is arranged in such a way that the air flow path is provided with multiple openings adjacent to the dispensing position 19 of the inhaler, so that the medicament doses of opened blisters are placed in fluid communication with the air flow path. In this way, when the user inhales through the mouthpiece 5, the powder medicament can be drawn out of the blisters by the turbulent air flow and inhaled.

FIG. 4 shows the back sides of the indexing wheels 15a, 15b, peeling spools 17a, 17b and coiling spools 23a, 23b, each of which is rotatably mounted in the housing and provided with a gear wheel for driven rotation. The gear wheels form part of a gear train which is driven by opening the mouthpiece cover 7 (FIG. 1).

For this purpose, the mouthpiece cover 7 (not shown in FIG. 4) is coupled to a first gear wheel 27, which is arranged to rotate with the mouthpiece cover 7 about its rotation axis. In particular, the first gear wheel 27 is arranged to rotate forwards and backwards when the mouthpiece cover 7 is opened and closed.

The first gear wheel 27 is arranged to selectively drive a second gear wheel 29 which is mounted coaxially with the first gear wheel 27 on a stub shaft 3a. The second gear wheel 29 is a drive gear of the dispensing mechanism and directly or indirectly drives the indexing wheels 15a, 15b, peeling spools 17a, 17b and coiling spools 23a, 23b when the mouthpiece cover 7 is opened. The coiling spools 23a, 23b are also driven via idler gear wheels 31, 33. The first and second gear wheels 27, 29 will now be described in greater detail.

The first gear wheel 27 is directly coupled to a hub of the mouthpiece cover 7, which is covered by the housing 3 in FIG. 1. For this purpose, a front face of the first gear wheel 27 is provided with a raised rib 27a, which is received into a corresponding slot of the hub. When the mouthpiece cover 7 is opened and closed, the slot engages the rib 27a to transmit torque, so that the first gear wheel 27 rotates with the mouthpiece cover 7.

The outer circumference of the first gear wheel 27 is provided with a plurality, in this embodiment five, resilient drive pawls 27b which are equally spaced-apart at an angle of 72 degrees. It should be noted that other embodiments may comprise a different number of resilient drive pawls 27b. For example, another preferred embodiment comprises four resilient drive pawls which are equally spaced-apart at an angle of 90 degrees.

The resilient drive pawls 27b of the first gear wheel 27 are arranged to selectively engage corresponding ratchet teeth 29a formed as an internal gear on the second gear wheel 29. In particular, when the first gear 27 is rotated forwards upon opening of the mouthpiece cover 7, the resilient drive pawls 27b come into contact with and engage the ratchet teeth 29a of the second gear wheel 29 so as to drive it forwards. However, when the first gear 27 is rotated backwards upon closing of the mouthpiece cover 7, the resilient drive pawls 27b slide over the ratchet teeth 29a of the second gear wheel 29 so that it is not driven.

The second gear wheel 29 is provided about its outer circumference with a second plurality of ratchet teeth 29b which function, together with a fixed pawl attached to the housing (not shown), as a means for preventing reverse rotation of the second gear wheel 29.

The second gear wheel 29 is also provided about its outer circumference, in a different axial plane, with a set of ordinary gear teeth 29c which engage and drive a first one of the indexing wheels 15b. This indexing wheel 15b drives the other indexing wheel 15a and a first one of the peeling spools 17b. The other indexing wheel 15a drives the other peeling spool 17a. It will be understood that the gear train is sequenced so as to ensure that each of the driven elements rotates in the appropriate direction for dispensing the powder medicament from the blisters of the medicament carriers 201a, 201b.

Further detail relating to the structure and design of a suitable dispensing mechanism can be found for example in WO 2007/068896 A1.

Figure 5A:
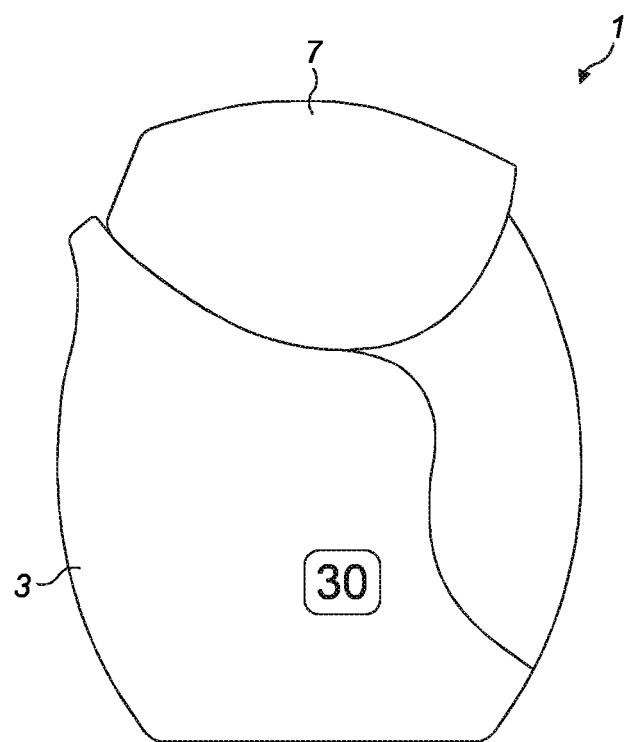
FIGS. 5a and 5b are schematic views showing the inhaler and a part of its dispensing mechanism in a first position of the mouthpiece cover.
Figure 5B:
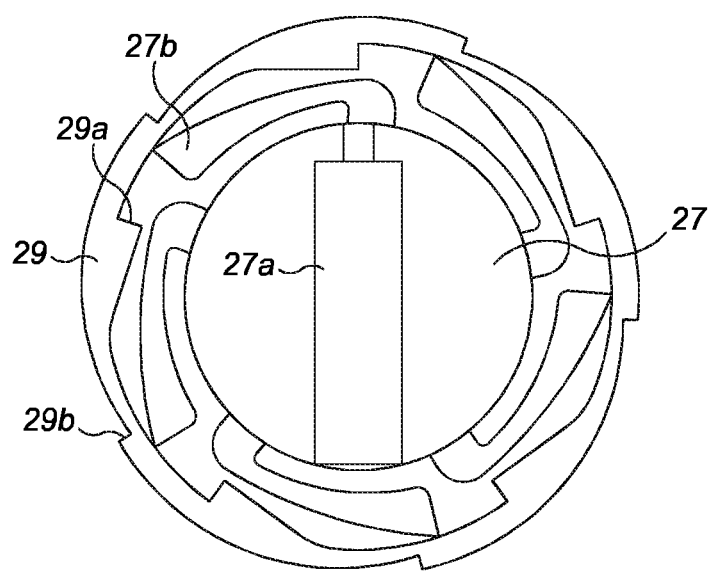
Figure 6A:
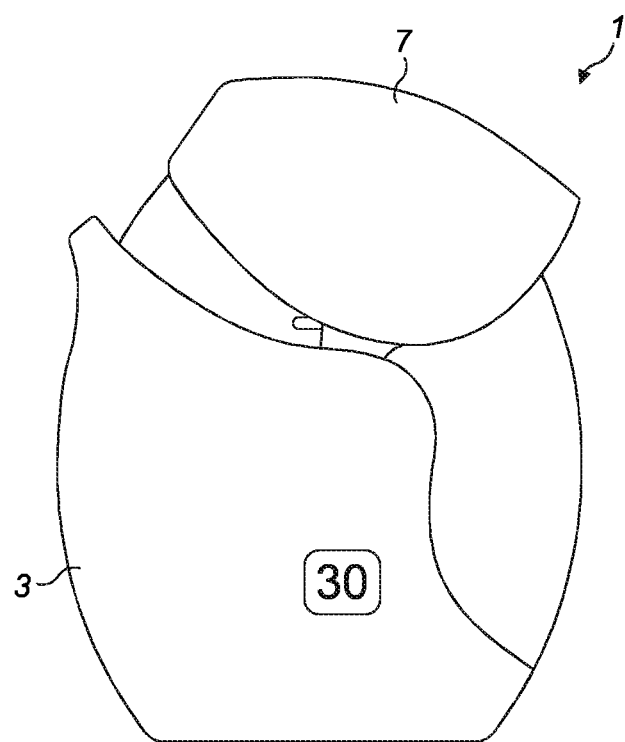
FIGS. 6a and 6b are schematic views showing the inhaler and a part of its dispensing mechanism in a second position of the mouthpiece cover.
Figure 6B:
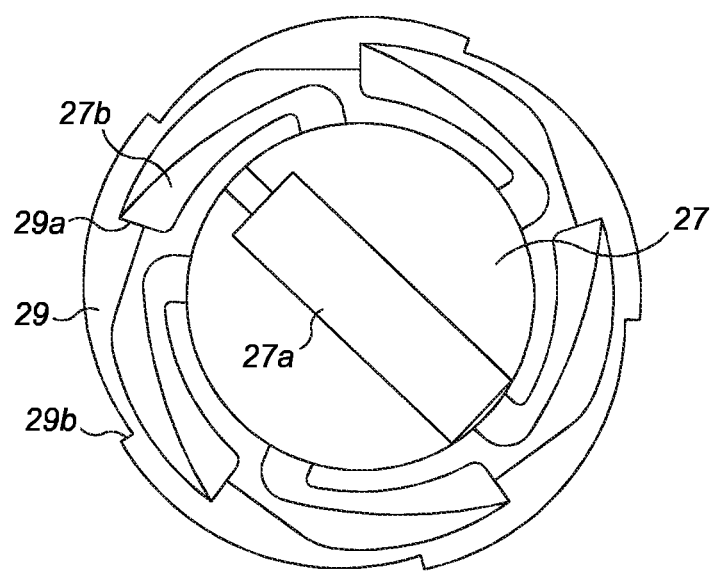
Figure 7A:
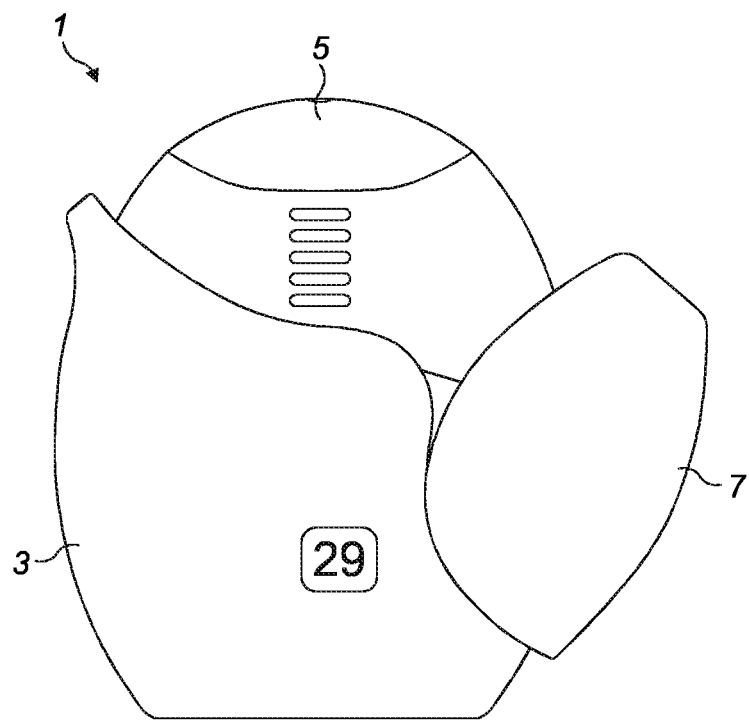
FIGS. 7a and 7b are schematic views showing the inhaler and a part of its dispensing mechanism in a third position of the mouthpiece cover.
Figure 7B:
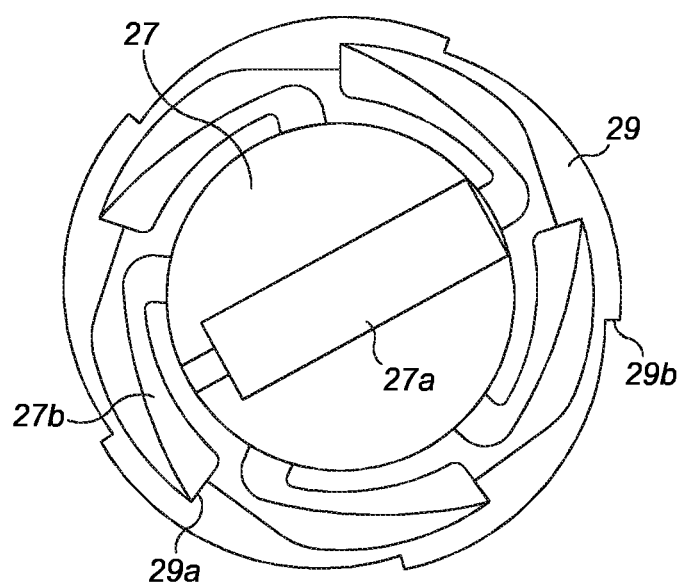

Operation of the dispensing mechanism, will now be described with reference to FIGS. 5a to 7b. FIGS. 5a and 5b are schematic views showing the inhaler 1 and a part of its dispensing mechanism in a first position of the mouthpiece cover 7. FIGS. 6a and 6b are schematic views showing the inhaler 1 and a part of its dispensing mechanism in a second position of the mouthpiece cover 7. FIGS. 7a and 7b are schematic views showing the inhaler 1 and a part of its dispensing mechanism in a third position of the mouthpiece cover 7. It is noted that FIGS. 5b, 6b and 7b show an opposite (back) side of the inhaler to that shown in FIGS. 5a, 6a and 7a (which is a front side).

Referring now to FIG. 5a, the inhaler 1 is shown with the mouthpiece cover 7 in its first position, which is its normal (completely closed) position when the inhaler 1 is not in use. In this position, the mouthpiece 5 is completely covered by the mouthpiece cover 7 and the mouthpiece cover 7 is rotated to the maximum extent possible in the counter-clockwise direction (also referred to herein as the backwards direction). In this position, the mouthpiece 5 is completely protected from contamination. Such contamination can be unhygienic and can potentially affect the medicament delivery performance of the inhaler 1.

FIG. 5b is a view showing the first gear wheel 27 and second gear wheel 29 when the mouthpiece cover 7 is in the first position shown in FIG. 5a. In this position, the resilient drive pawls 27b of the first gear wheel 27 are spaced away from, and are not therefore engaged with, the corresponding ratchet teeth 29a formed as an internal gear on the second gear wheel 29.

FIG. 6a shows the inhaler 1 after the mouthpiece cover 7 has been moved from the first position to the second position. In this position, the mouthpiece cover 7 has rotated clockwise (or forwards) but the mouthpiece 5 is still completely covered by the mouthpiece cover 7. Movement of the mouthpiece cover 7 from the first position to the second position may enclose an angle of at least 5 degrees and, in the illustrated embodiment, encloses an angle of 10 degrees.

FIG. 6b is a view showing the first gear wheel 27 and second gear wheel 29 when the mouthpiece cover 7 is in the second position shown in FIG. 6a. In this position, the first gear wheel 27 has rotated forwards (counter-clockwise in this view) to bring the resilient drive pawls 27b just into contact with the corresponding ratchet teeth 29a of the second gear wheel 29. The second gear wheel 29 has not, however, moved, and so the dispensing mechanism of the inhaler 1 has not yet been driven.

FIG. 7a shows the inhaler 1 after the mouthpiece cover 7 has been moved from the second position to the third position. In this position, the mouthpiece cover 7 has rotated further clockwise (or forwards) to completely uncover the mouthpiece 5 ready for the user to inhale dispensed doses of the powder medicament. In this position, the mouthpiece cover 7 is rotated to the maximum extent possible in the clockwise direction. For reasons that will become apparent from the following description, movement of the mouthpiece cover 7 from the second position to the third position encloses an angle of exactly 72 degrees. This implies that, in the illustrated embodiment, movement of the mouthpiece cover 7 from the first position to the third position encloses a total angle of 82 degrees (i.e. 10 degrees plus 72 degrees).

FIG. 7b is a view showing the first gear wheel 27 and second gear wheel 29 when the mouthpiece cover 7 is in the third position shown in FIG. 7a. In this position, the first gear wheel 27 has rotated further forwards (counter-clockwise in this view) and in this case the resilient drive pawls 27b have engaged the corresponding ratchet teeth 29a of the second gear wheel 29 to drive the second gear wheel 29 forwards. This driving of the second gear wheel 29 functions to drive the dispensing mechanism so that the next medicament-containing blister of each medicament carrier 201a, 201b is moved to the dispensing position 19 of the inhaler 1 and so that the cover layers 207a, 207b are peeled away to place the medicament doses in fluid communication with the air flow passage of the manifold 25, ready for inhalation by the user.

The mouthpiece cover 7 is configured so that movement from the second position to the third position encloses an angle of exactly 72 degrees because this results in the five resilient drive pawls 27b of the first gear wheel 27 and the corresponding five ratchet teeth 29a of the second gear wheel 29 rotating through 72 degrees so that they start and end with the same angular positions, as can be seen by comparing FIGS. 6b and 7b, which facilitates resetting the device when the mouthpiece cover 7 is subsequently closed.

In particular, when the mouthpiece cover 7 is closed after use of the inhaler 1, by rotating the mouthpiece cover 7 counter-clockwise from the third position shown in FIG. 7a to the first position shown in FIG. 5a, the second gear wheel 29 is prevented from rotating backwards (clockwise in the views of FIGS. 5b, 6b and 7b) owing to the means for preventing reverse rotation 29b and therefore remains in the same angular position. The first gear wheel 27 rotates backwards (clockwise in the views of FIGS. 5b, 6b and 7b) as the mouthpiece cover 7 is closed, with the resilient drive pawls 27b sliding back over the ratchet teeth 29a of the second gear wheel 29 to the position shown in FIG. 6b and then back to the position shown in FIG. 5b.

With the mouthpiece cover 7 closed, the five resilient drive pawls 27a of the first gear wheel 27 and the corresponding five ratchet teeth 29a of the second gear wheel 29 have the positions shown in FIG. 5b, ready for the next use.

The inhaler 1 described above comprises a first gear wheel 27 having five resilient drive pawls 27b. It should be noted that the first gear wheel may instead comprise a different number of resilient drive pawls. For example, the first gear wheel may be provided with four resilient drive pawls equally spaced-apart at 90 degree intervals (and correspondingly the second gear wheel may be provided with four ratchet teeth equally spaced-apart at 90 degree intervals), in which case movement of the mouthpiece cover from the second position to the third position would encloses an angle of exactly 90 degrees (360 degrees divided by four).

The inhaler 1 described above provides an arrangement in which movement of the mouthpiece cover 7 from the first position shown in FIG. 5a to the second position shown in FIG. 6a does not result in any actuation of the dispensing mechanism and does not uncover the mouthpiece 5, even partly. As such, actuation caused by unintentional or accidental movement of the mouthpiece cover when the inhaler is not in use can be avoided. Further, such unintentional or accidental movement of the mouthpiece cover does not risk of contamination of the mouthpiece, since the mouthpiece remains completely covered.

The manifold component 25 of the inhaler 1 will now be described in detail. As noted above, the manifold component 25 may be a unitary moulded plastics component arranged in the housing 3 and which defines an air flow path extending from the air inlet 9 (FIG. 1) to the mouthpiece 5, with which it interfaces.

The manifold component 25 may be formed of any polymer-based material that is suitable for moulding. Such materials include: polyolefins, including polyethylene, in particular high density polyethylene (HDPE), and polypropylene; polyesters, including polyethylene terephthalate; polyamides, including nylons; thermosetting polymers, including urea-formaldehyde, melamine, epoxy resins and polyimides; and mixtures or copolymers thereof.

Figure 8:
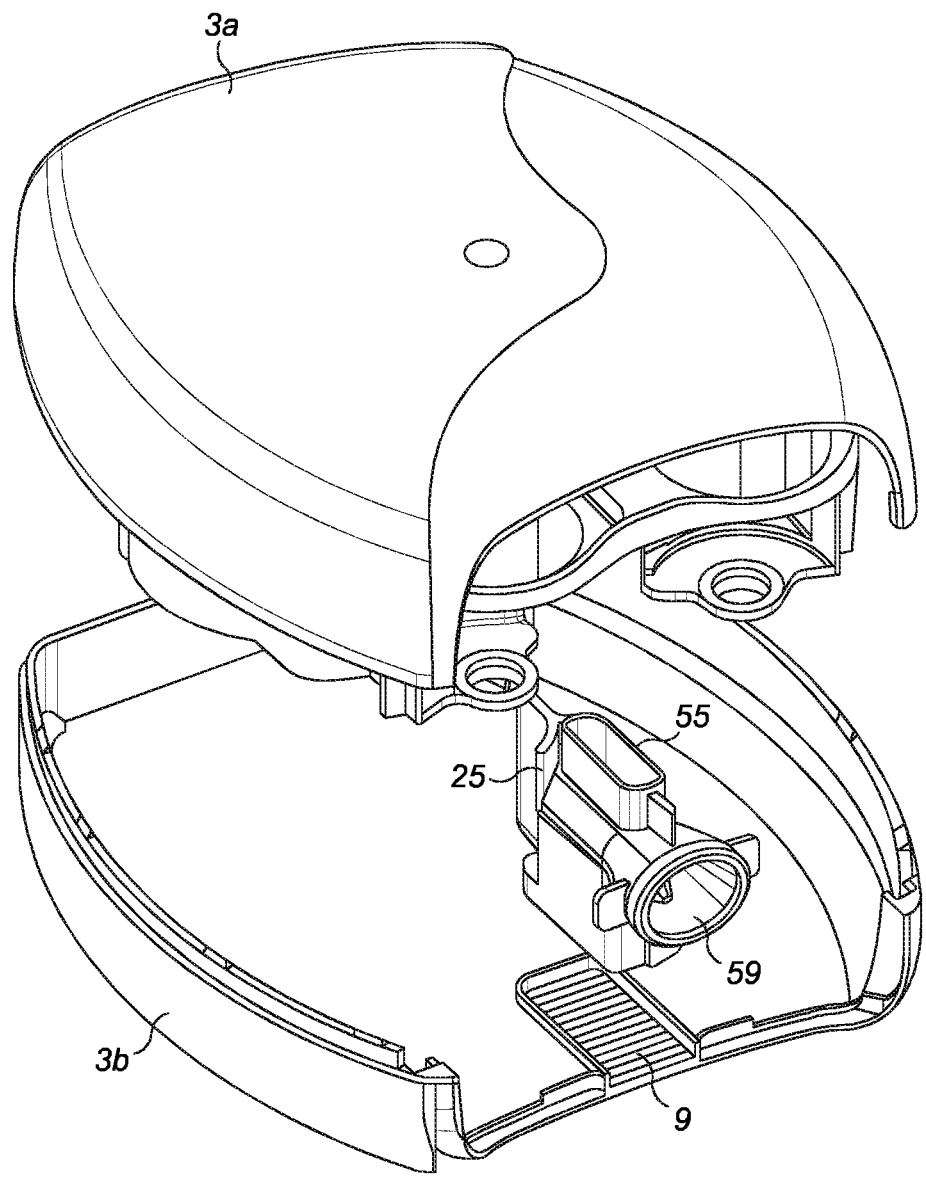
FIG. 8 is an exploded perspective view showing a manifold component of the inhaler together with components forming a housing of the inhaler.

FIG. 8 is an exploded perspective view showing the manifold component 25 of the inhaler 1 together with a pair of shell-like components 3a, 3b that form the housing 3. The remaining components of the inhaler 1 have been omitted from FIG. 8 for clarity reasons. The manifold component 25 is arranged in the housing, in the illustrated orientation, so as to interface with the air inlet 9 and the mouthpiece 5 (not shown in FIG. 8), between which it provides the air flow path. The manifold component 25 also interfaces with the opened blisters of the blister packs (not shown in FIG. 8).

Figure 9:
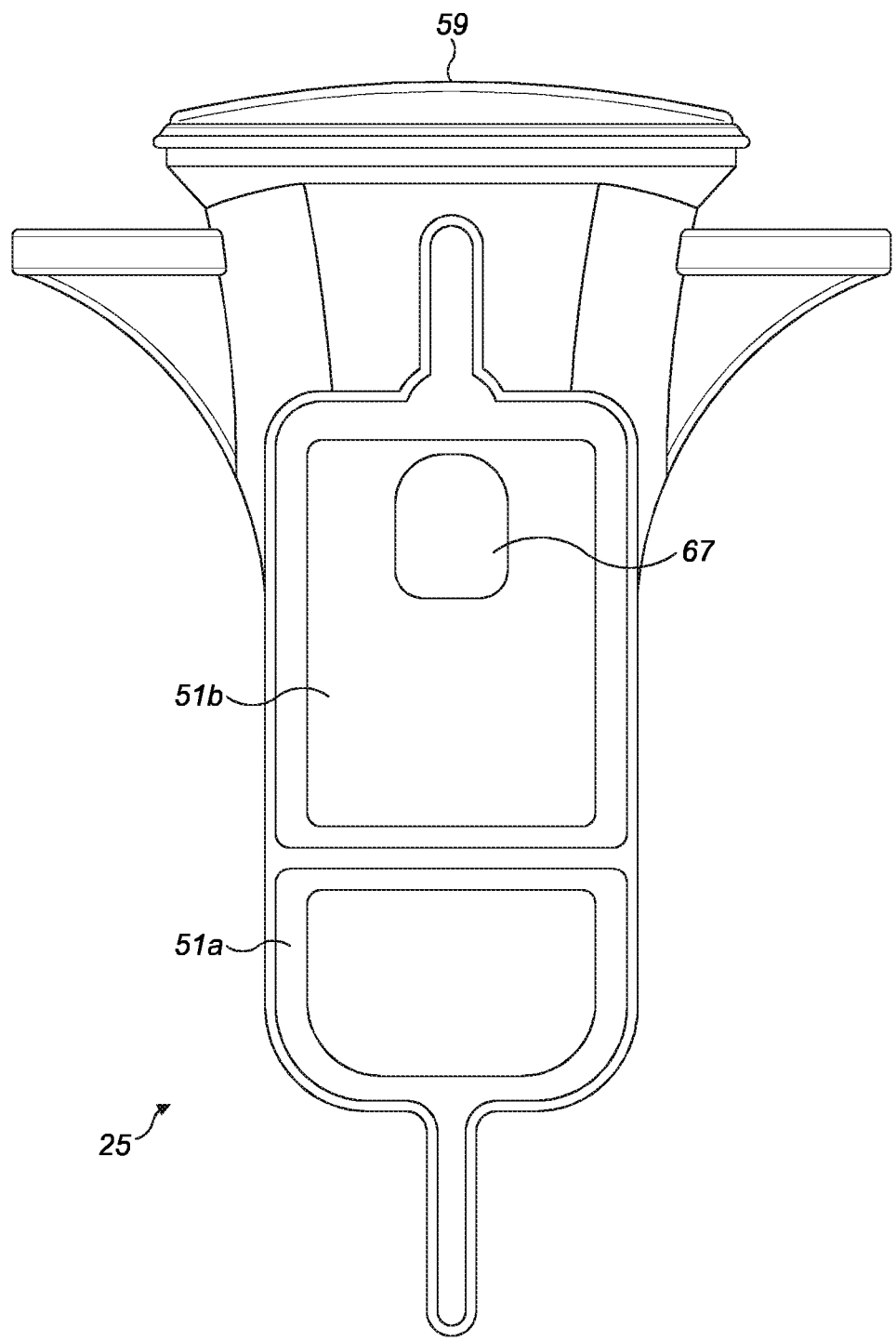
FIG. 9 is a top view of the manifold component.
Figure 10:
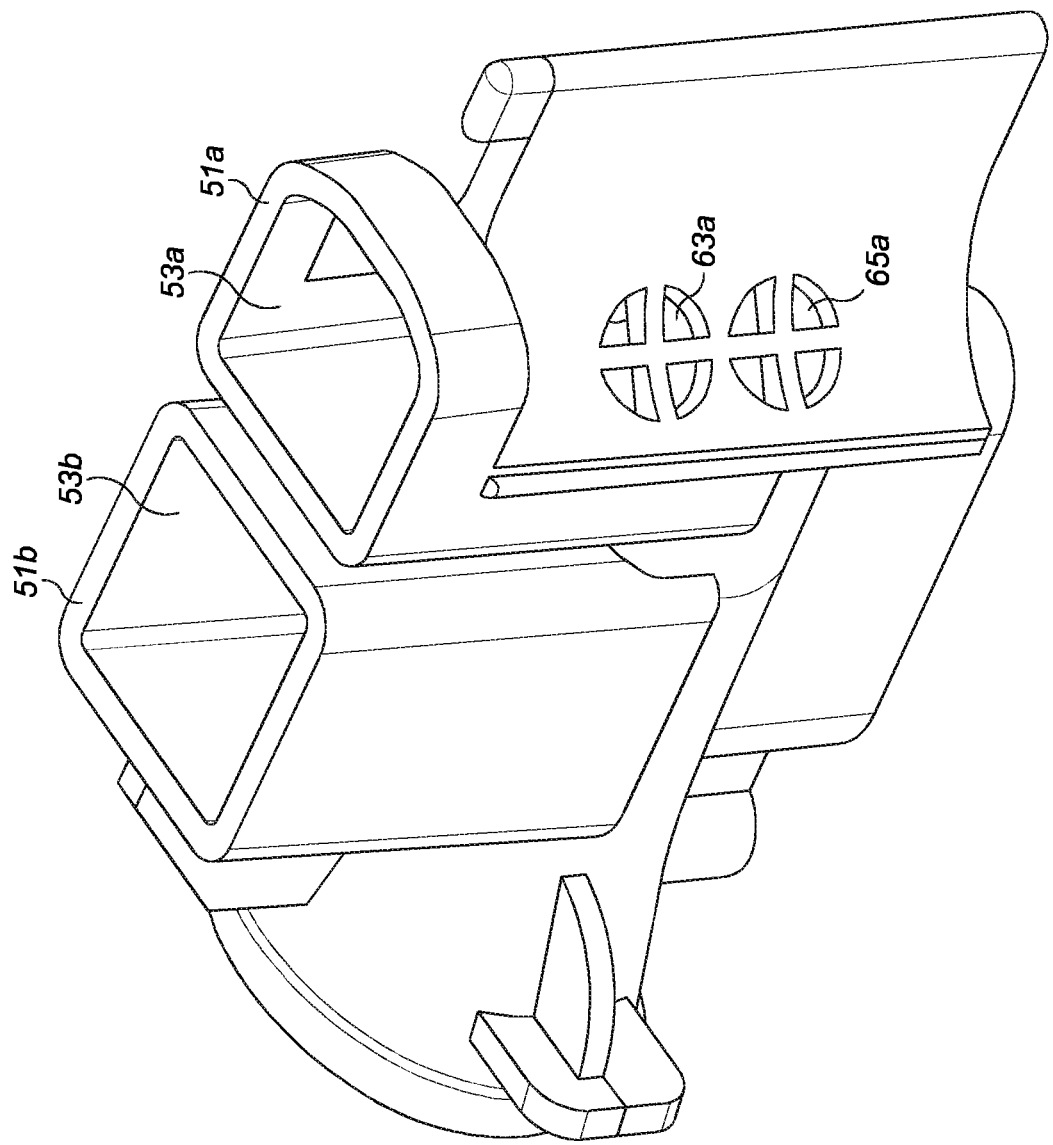
FIG. 10 is a perspective view of the manifold component.
Figure 11:
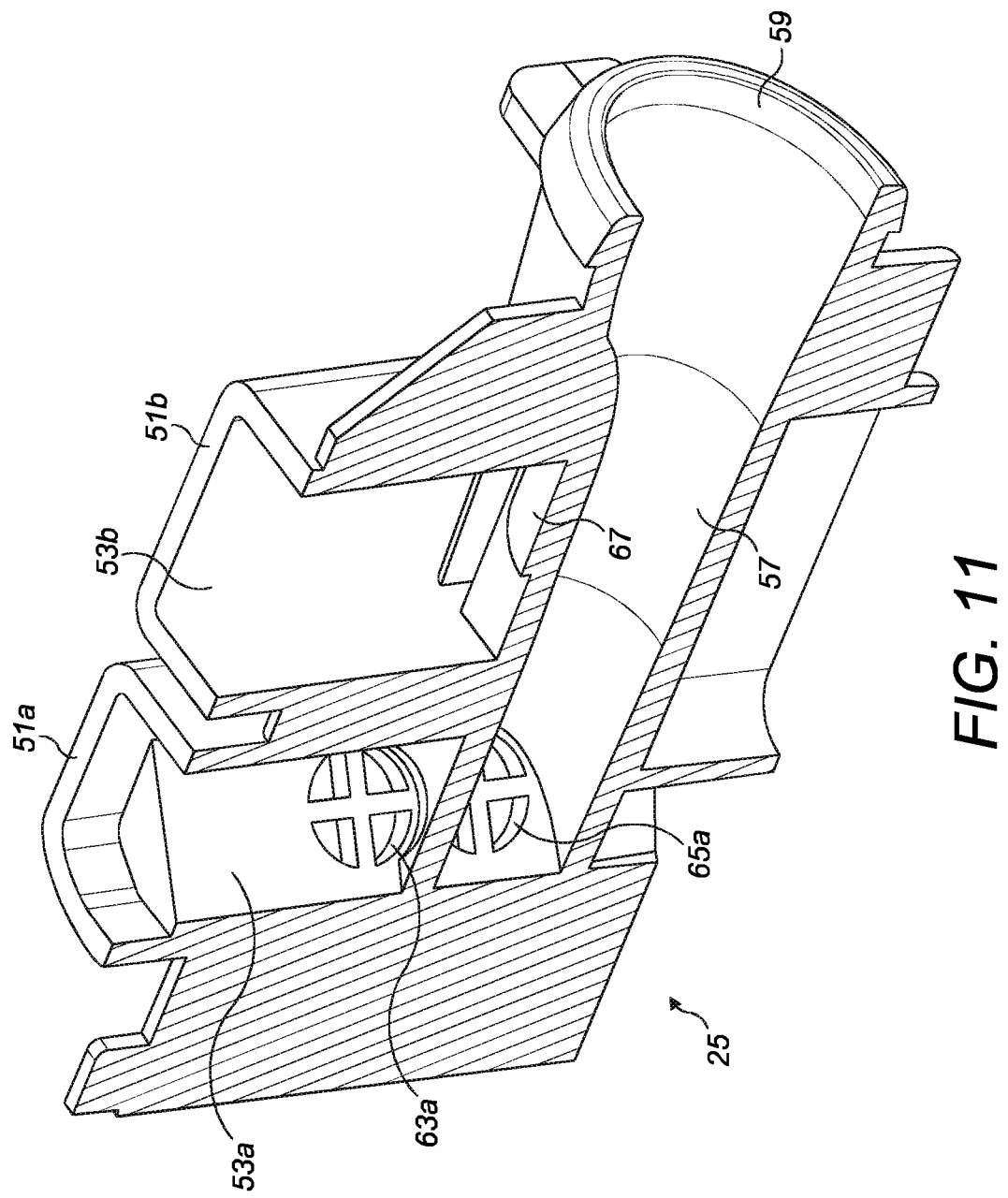
FIG. 11 is a sectioned perspective view of the manifold component.
Figure 12:
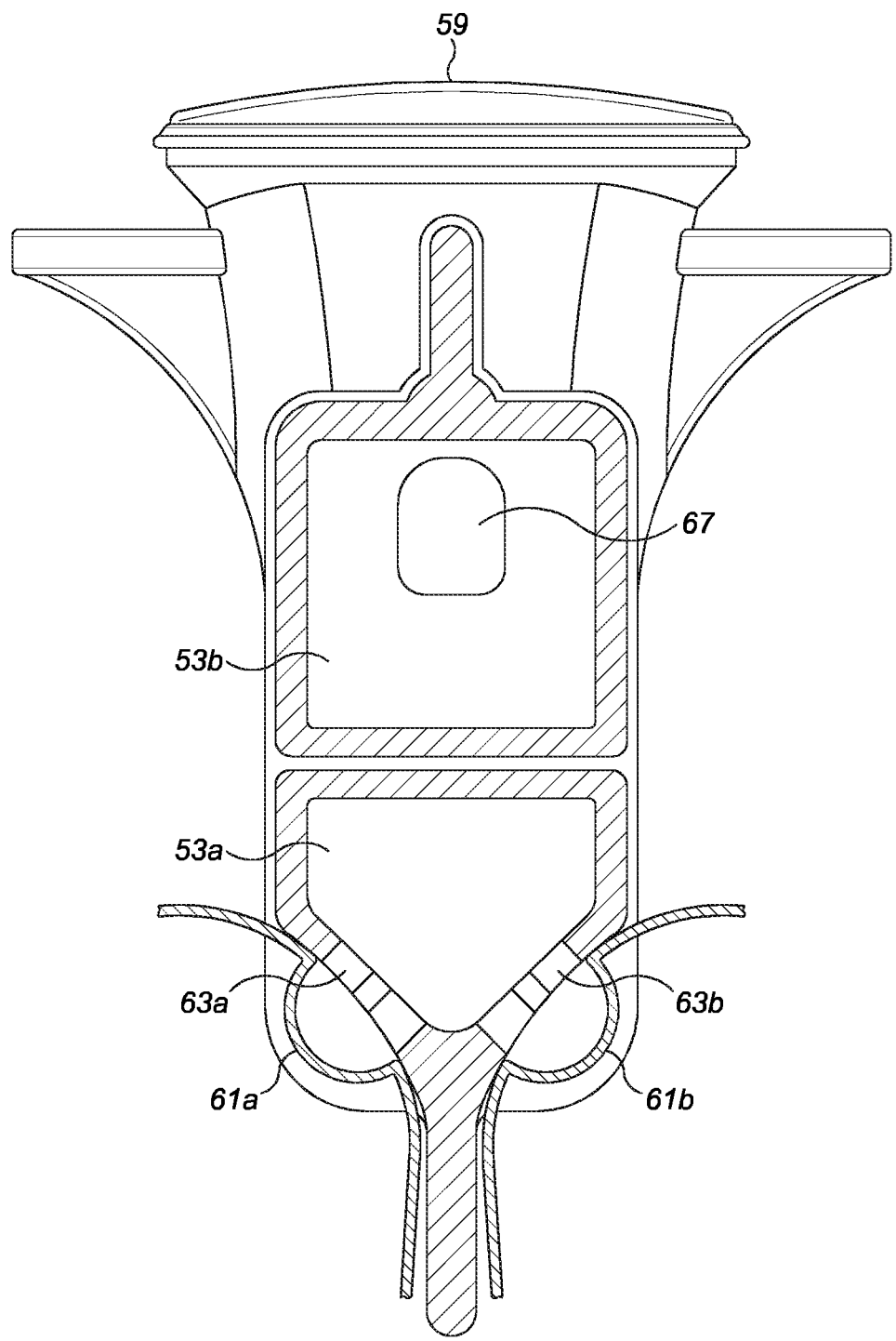
FIG. 12 is a sectioned top view of the manifold component interfacing with a pair of adjacent blister packs.

FIGS. 9 to 12 illustrate the manifold component 25 in greater detail. FIG. 9 is a top view of the manifold component 25 and FIG. 10 is a perspective view of the manifold component 25. FIGS. 11 and 12 are sectioned views of the manifold component 25; the former being a perspective view (taken from the opposite side to that of FIG. 10; also showing hidden detail) and the latter being a top view. The manifold component 25 has a number of moulded structures which are described below. FIG. 12 also illustrates first and second opened blisters 61a, 61b of the respective blister packs, with which the manifold component 25 interfaces, in use.

More specifically, the manifold component 25 comprises a primary air inlet opening 51a and an auxiliary air inlet opening 51b for receiving external air directly from the air inlet 9 of the inhaler. A primary air delivery conduit 53a extends from the primary air inlet opening 51a and an auxiliary air delivery conduit 53b extends from the auxiliary air inlet opening 51b. Both the air inlet openings 51a, 51b and the air delivery conduits 53a, 53b have a substantially rectangular cross-section and are arranged side-by-side, separated by narrow walls.

The air delivery conduits 53a, 53b are separately formed so that the external air from each of the primary and auxiliary air inlet openings 51a, 51b does not mix with the external air from the other of the primary and auxiliary air inlet openings 51a, 51b before reaching the first and second opened blister pockets 61a, 61b, as will be explained below. Furthermore, the primary and auxiliary air inlet openings 51a, 51b preferably define the only points of entry for external air into the manifold component 25 (and into the inhaler 1).

An end of the manifold component 25 opposing the air inlet openings 51a, 51b is provided with a mounting protrusion 55 (FIG. 8) which is engaged in a corresponding recess of the housing 3. It should be noted that the mounting protrusion 55 does not define any part of the air flow path and is provided only for assembly purposes.

The manifold component 25 also comprises a medicament delivery conduit 57 which opens out into a medicament outlet opening 59 for delivery of air-entrained medicament from first and second opened blister pockets to the mouthpiece 5 (not shown in FIGS. 8 to 12), and on to the user. The medicament delivery conduit 57 and the medicament outlet opening 59 both have a generally circular cross-section. The medicament delivery conduit 57 partly tapers along its length, with an increasing cross-sectional area in the direction of air flow.

As illustrated most clearly in FIG. 11, the primary and auxiliary air delivery conduits 53a, 53b are arranged in the manifold component 25 to be adjacent to the medicament delivery conduit 57. The primary air delivery conduit 53a is separated from the medicament delivery conduit 57 by narrow walls. The auxiliary air delivery conduit 53b is fluidly connected to the medicament delivery conduit 57 through an opening 67.

Furthermore, it can be seen from FIG. 11 that the primary and auxiliary air delivery conduits 53a, 53b extend in a direction (vertically in the drawing) that is substantially perpendicular to the direction (horizontally in the drawing) in which the medicament delivery conduit 57 extends. In this way, air-entrained medicament can be delivered to the mouthpiece 5 in a direction that is substantially perpendicular to the direction in which external air is received from the air inlet 9, so as to accommodate the relative orientations of the mouthpiece 5 and air inlet 9 of the inhaler 1. This arrangement also allows the air-entrained medicament to pass from the opened blister pockets to the mouthpiece 5 without traversing any bends, which could lead to undesirable medicament deposition and build up on the surfaces of the medicament delivery conduit 57.

The manifold component 25 also comprises first and second air outlet openings 63a, 63b for providing the external air from the primary air conduit 53a to respective first and second opened blister pockets 61a, 61b, and first and second medicament inlet openings 65a, 65b for receiving air-entrained medicament from the respective first and second opened blister pocket 61a, 61b and providing it to the medicament delivery conduit 57. As can be seen in FIGS. 10 and 11, the first air outlet opening 63a and the first medicament inlet opening 65a are arranged side-by-side to enable simultaneous communication with the first opened blister pocket 61a. The second air outlet opening 63b and the second medicament inlet opening 65b (not shown in FIGS.

10 and 11) are similarly arranged side-by-side to enable simultaneous communication with the second opened blister pocket 61b.

The first and second air outlet openings 63a, 63b are provided in a side wall of the primary air delivery conduit 53a, whereas the first and second medicament inlet openings 65a, 65b are provided in an end wall of the medicament delivery conduit 57 (directly facing the medicament outlet opening 59). The second air outlet opening 63b and the second medicament inlet opening 65b are not shown in FIGS. 10 and 11, but have the same size and shape as the corresponding first air outlet opening 63a and first medicament inlet opening 65a. In fact, the second air outlet opening 63b and the second medicament inlet opening 65b are mirror images of the first air outlet opening 63a and the first medicament inlet opening 65a, respectively (see FIG. 12).

The air outlet openings 63a, 63b and the medicament inlet openings 65a, 65b are arranged in curved side walls of the manifold component 25 (referring to FIG. 12). In this way, the blister packs, in which the first and second opened blisters 61a, 61b are provided, are able to slide along the side wall while maintaining substantial contact therewith and providing a substantial fluid (powder and air) seal around the opened blister pockets 61a, 61b.

In use of the inhaler, the user inhales through the mouthpiece 5, which induces an airflow through the manifold component 25. In particular air is drawn into the primary air inlet opening 51a and into the primary air delivery conduit 53a. The air then passes through the first and second air outlet openings 63a, 63b, and into the respective opened blister pockets 61a, 61b where it entrains the medicament. The air-entrained medicament then passes through the first and second medicament inlet openings 65a, 65b, along the medicament delivery conduit 57, and out through the medicament outlet opening 59, from where it is delivered to the user via the mouthpiece 5.

The auxiliary air delivery conduit 53b serves to provide an auxiliary air flow from the auxiliary air inlet 51b to the medicament delivery conduit 57, which auxiliary air flow is independent of the primary air flow and bypasses the open blister pockets 61a, 61b. The auxiliary airflow is generated by the user's inhalation. The auxiliary air flow enters the medicament delivery conduit 57 perpendicular to the flow of air-entrained medicament and serves to disruptively impact the air-entrained medicament, to thereby create a more turbulent flow, which helps to deagglomerate the powder medicament and prevent its deposition and build up on the surfaces of the medicament delivery conduit 57.

By providing the auxiliary air delivery conduit 53b with its own air inlet opening for receiving external air (i.e. the auxiliary air inlet opening 51b), the airflow passing through the auxiliary air delivery conduit 53b can be controlled and adjusted (i.e. tuned) independently of the airflow passing through the opened blister pockets 61a, 61b. Such an arrangement allows for the respective airflows to be optimised for any given medicament formulation, for example to provide a greater or lesser auxiliary air flow relative to the primary air flow.

Such an arrangement also provides for a constant airflow resistance of the airflow path through the auxiliary air delivery conduit 53b, regardless of the amount of medicament remaining in the opened blister pockets 61a, 61b. In this way, the performance of the manifold component 25, and in particular the provision of auxiliary air for disruptively impacting the air-entrained medicament flowing through the medicament delivery conduit 57, can be made more consistent throughout use of the inhaler (i.e. throughout the user's inhalation of a dose of the medicament).

Figure 13:
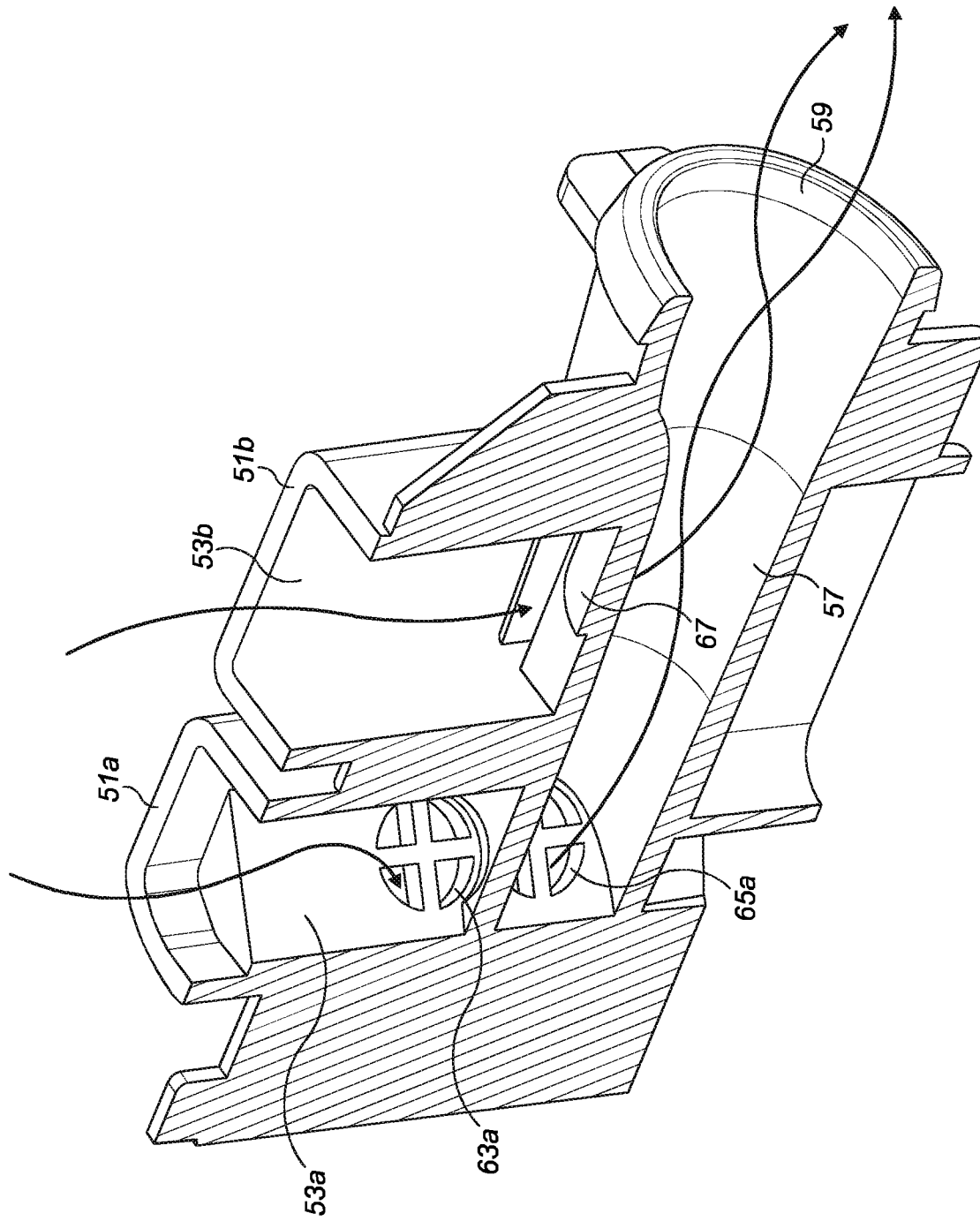
FIG. 13 is a view corresponding to FIG. 11 showing air flow through the manifold component.

FIG. 13 is a view corresponding to that of FIG. 11 and showing air flow through the manifold component 25, in use of the inhaler 1. In particular, as has been described, when the user inhales at the mouthpiece 5 (not shown in FIG. 12), external air is drawn into the air conduits 53a, 53b through the air inlet openings 51a, 51b. As illustrated by arrows having heads in FIG. 13, the primary and auxiliary air flows collide with each other in the medicament delivery conduit 57, which creates a more turbulent flow, and which helps to deagglomerate the powder medicament and prevent its deposition and build up on the surfaces of the medicament delivery conduit 57.

Figure 14B:
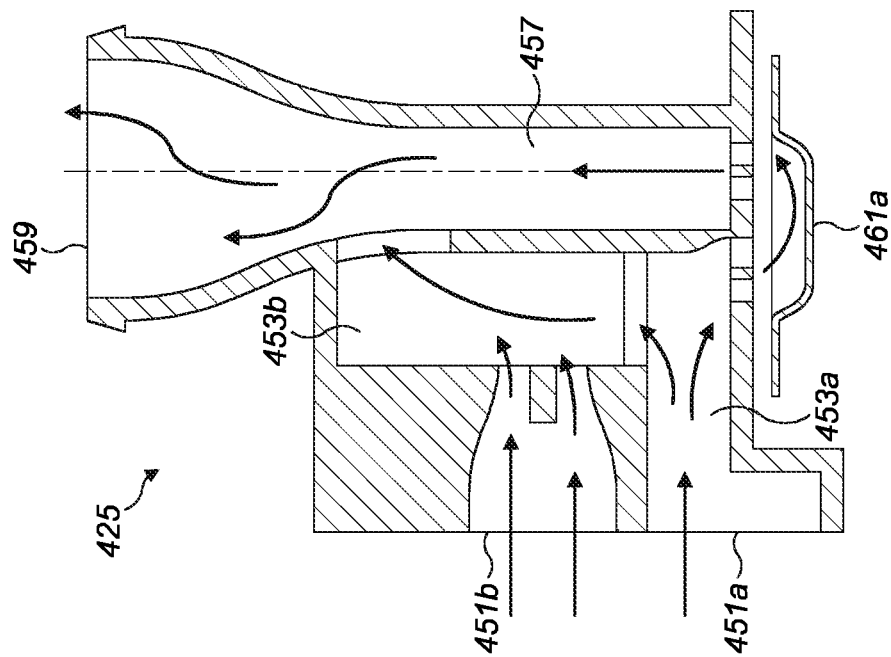
FIGS. 14a and 14b are schematic cross-sectional views illustrating variant embodiments of the first aspect of the invention.
Figure 14A:
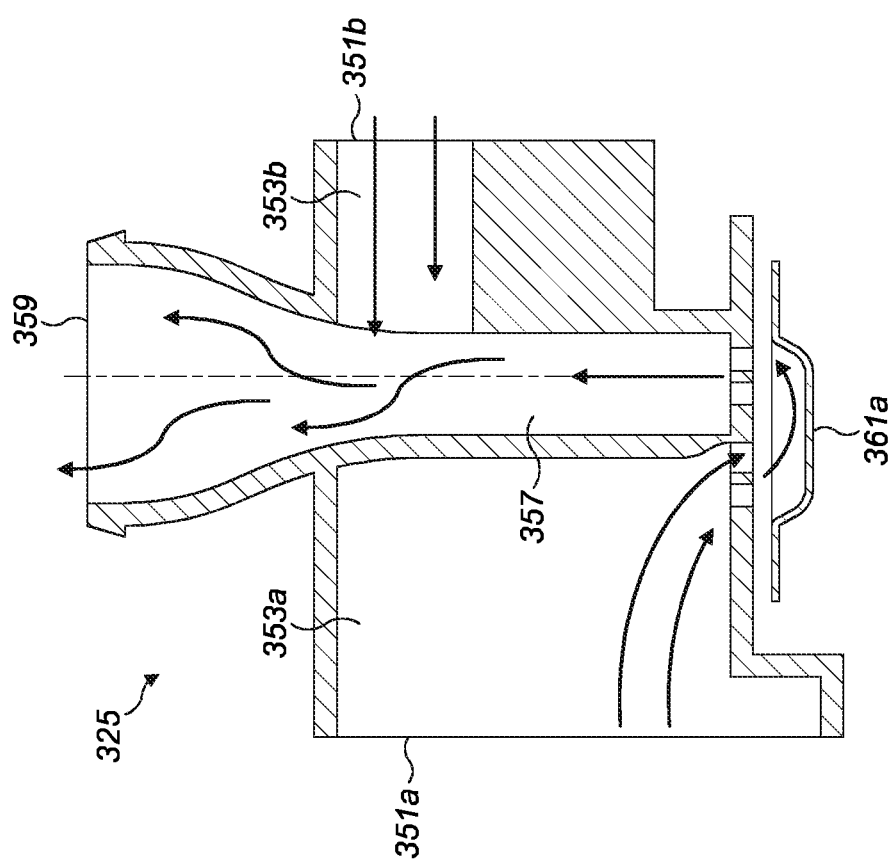

FIGS. 14a and 14b are a schematic cross-sectional views illustrating variant embodiments of the first aspect of the invention. These drawings illustrate the manifold component 325, 425 of the variant embodiments, the other components of the variant embodiments being essentially the same as those of the main embodiment described above. Structures, openings and conduits for use with a first blister pocket 361a, 461a are shown; however, it will be understood that corresponding structures, openings and conduits for a second blister pocket are also provided but not shown.

In FIG. 14a, the manifold component 325 is designed so that the auxiliary air inlet opening 351b and auxiliary air delivery conduit 353b are arrange on an opposite side of the medicament delivery conduit 357, as compared to the primary air inlet opening 351a and the primary air delivery conduit 353a. Such an arrangement may allow for the geometry of the manifold component 325 to be optimised or improved, for example with larger conduits and/or reduced air resistance. In other embodiments, a plurality of auxiliary air inlet openings 351b and respective auxiliary air delivery conduits 353b may be arranged around and/or along the medicament delivery conduit 357.

In FIG. 14b, the manifold component 425 is designed so that the auxiliary air delivery conduit 453b is fluidly connected to the primary air delivery conduit 453a, so that the auxiliary air delivery conduit 453b receives air from both the primary air inlet opening 451a and the auxiliary air inlet opening 451b. In this way, the air flow in the auxiliary air delivery conduit 453b may be even more turbulent, thereby enhancing its disruptive effect on the medicament-laden air passing along the medicament delivery conduit 457. The auxiliary air delivery conduit 453b may be provided with one or more one-way valves so as to prevent air from the auxiliary air inlet opening 451b reaching the opened blister pocket 461a via the primary air delivery conduit 453a.

Figure 15A:
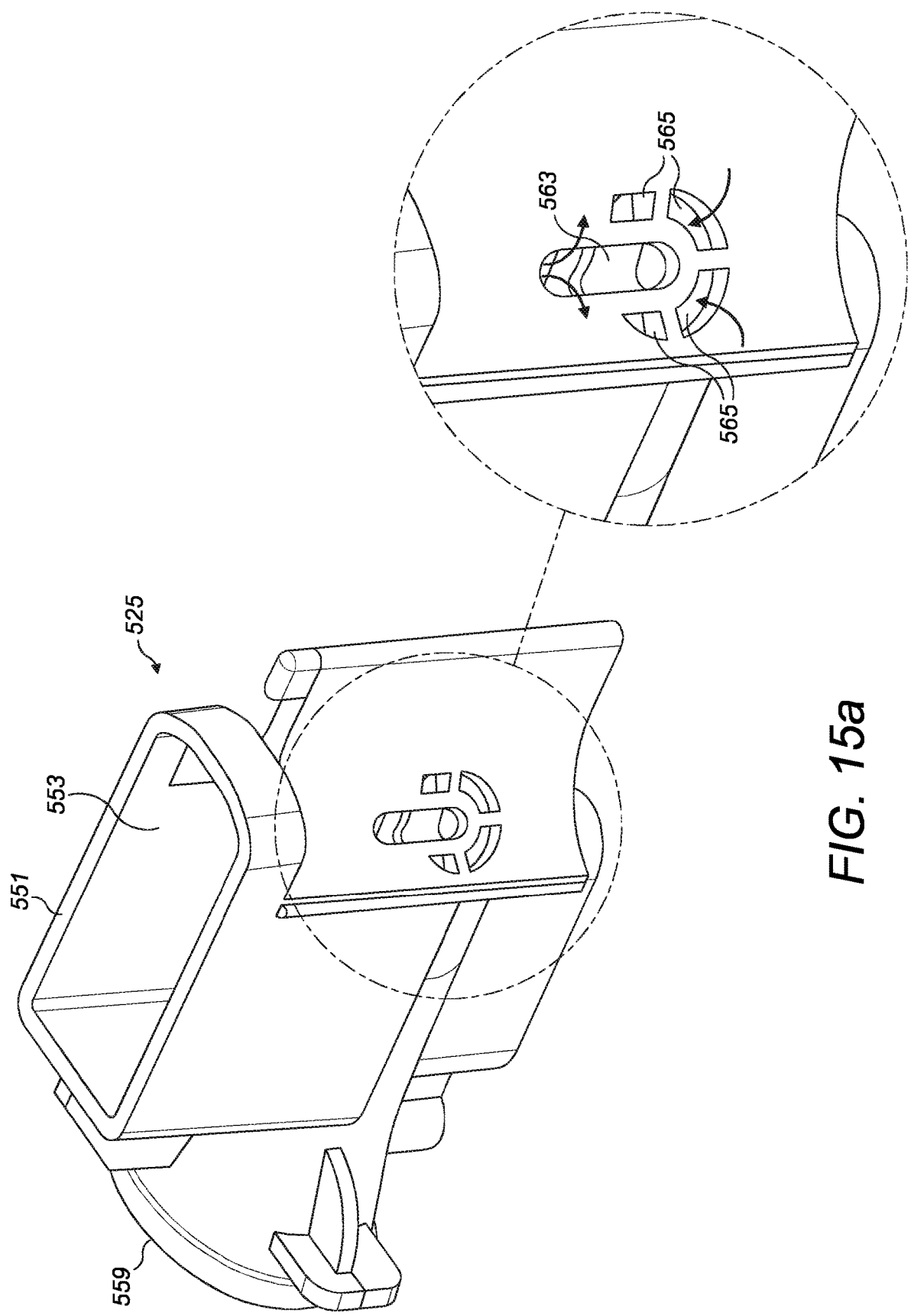
FIGS. 15a and 15b are views for describing an embodiment of the second aspect of the invention, in particular illustrating the manifold component.
Figure 15B:
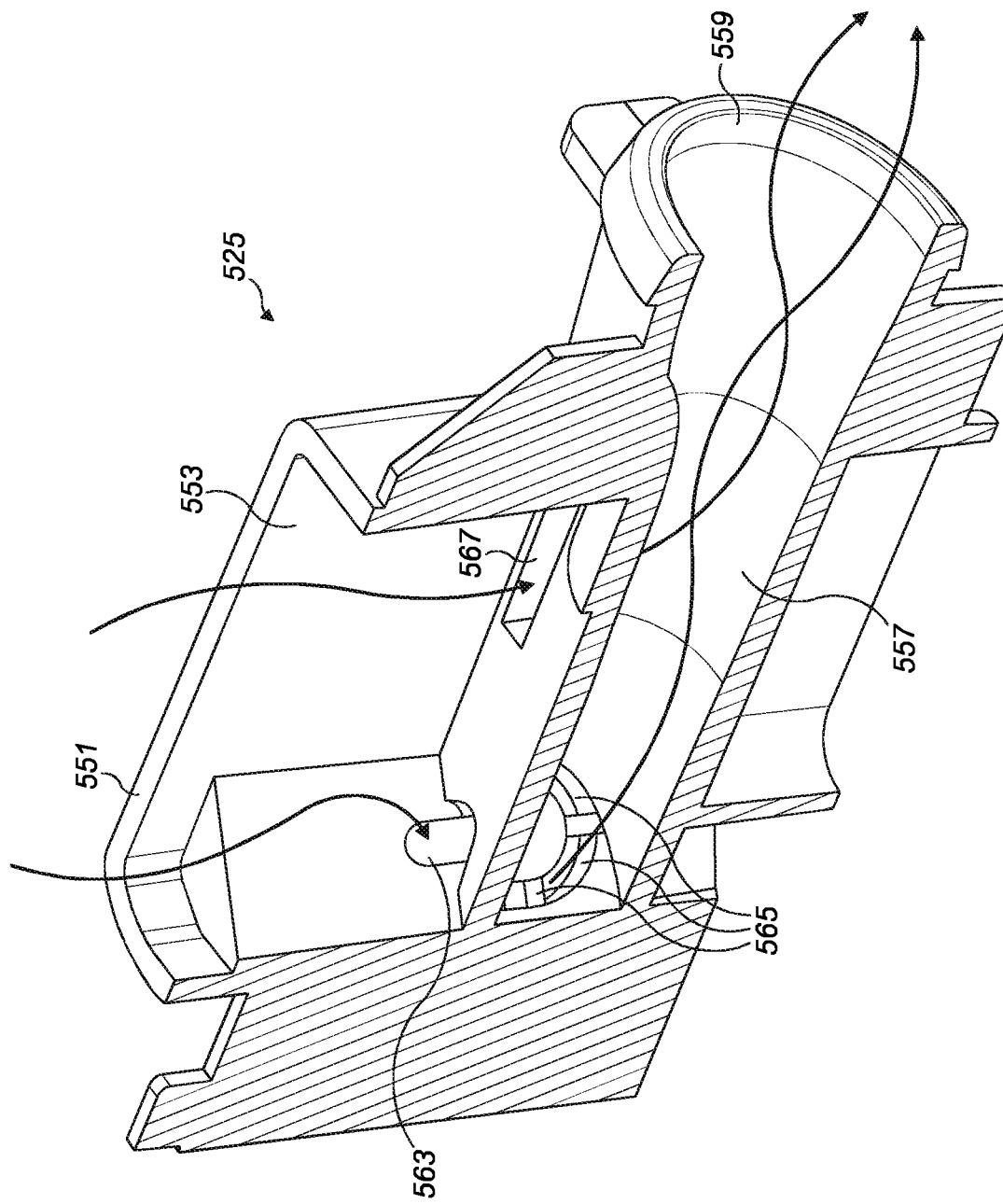

The second aspect of the invention will now be described. FIGS. 15a and 15b are views for describing a dry powder inhaler according to a non-limiting embodiment of the second aspect of the invention, in particular illustrating the manifold component 525. More particularly, FIG. 15a is a perspective view of the manifold component 525 showing a surface against which an opened blister pocket passes, including an enlarged view of this surface. FIG. 15b is a view of the manifold component 525 from the opposite side compared to FIG. 15a, and is sectioned to illustrate structures within the manifold component 525.

The components of the dry powder inhaler other than the manifold component 525 are the same as those of the above-described embodiments of the first aspect of the invention, and will therefore not be described in any detail. The dry powder inhaler according to the second aspect of the invention therefore differs only in terms of the detailed design of the manifold component 525.

The manifold component 525 is, however, similar in terms of purpose and general structure to those of the manifold components 25, 325, 425 of the embodiments of the first aspect of the invention, but is not provided with an auxiliary air inlet opening 51*b* or an auxiliary air delivery conduit 53*b*, although such could in principle be provided. Thus, external air flows in to the manifold component 525 through a single air inlet opening 551.

In use, the external air flows through an air delivery conduit 553 before it passes out of the manifold component 525, through the opened blister pockets (not shown) where it entrains the medicament, then back in to the manifold component 525, and along a medicament delivery conduit 557. The air-entrained medicament then flows out of the manifold component 525 through a medicament outlet opening 559, and is delivered to the user's mouth via the inhaler mouthpiece 5.

A bypass opening 567 may be provided between the air delivery conduit 553 and the medicament delivery conduit 557 through which a portion of the external air drawn into the air inlet opening 551 may flow, as is known in the art for disruptively impacting the medicament-laden air flowing through the medicament delivery conduit 557.

In use, the air flows from the air delivery conduit 553 into the opened blister pockets (not shown) through first and second air outlet openings 563, one for each blister pocket. The medicament-laden air flows from the opened blister pockets to the medicament delivery conduit 557 through first and second medicament inlet openings 565, one for each blister pocket. It should be noted that only one of the air outlet openings 563 and (a corresponding) one of the medicament inlet openings 565 are visible in FIG. 15*a*, the others being hidden from view. Similarly, only (the same) one of the air outlet openings 563 and one of the medicament inlet openings 565 are visible in FIG. 15*b*, owing to the sectioning of the manifold component 525 in this drawing. However, it will be understood that the unillustrated openings have the same size and shape as the illustrated openings 563, 565, and are arranged to interface with a second one of the opened blister pockets.

As illustrated most clearly in the enlarged portion of FIG. 15*a*, according to the second aspect of the invention, each air outlet opening 563 is arranged to be positioned substantially centrally over the opened blister pocket (not shown), and each medicament inlet opening 565 is arranged to be positioned over the opened blister pocket so as to be closer to an edge of the opened blister pocket than the air outlet opening 563. The medicament inlet opening 565 also partially surrounds the air outlet opening 563, and in doing so defines an angle of at least 180 degrees, optionally at least 200 degrees, further optionally at least 220 about the air outlet opening 563.

Each air outlet opening 563 has an elongate shape, which may correspond to the shape of the periphery of the blister pockets (not shown). Each medicament inlet opening 565 has a curved or arcuate shape, in particular surrounding the air outlet opening 563, and also at least partially corresponding to the shape of the periphery of the blister pockets.

In the illustrated embodiment, each medicament inlet opening 565 is divided into a four adjacent openings each arranged to be positioned over a peripheral region of the opened blister pocket.

Such an arrangement is able to provide for more complete emptying of the medicament from the opened blister pockets. In particular, the provision of the medicament inlet openings 565 close to the edges of the blister pockets can help to prevent medicament being retained at the edge of the blister pockets. In this way, medicament dosing may be more consistent and medicament wastage minimised.

Figure 16B:
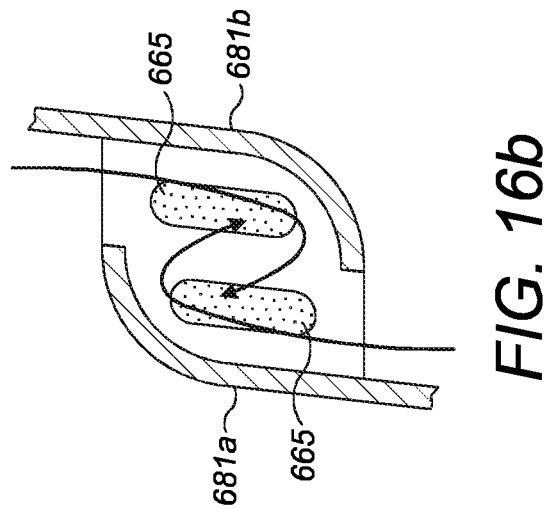
FIGS. 16a and 16b are views for describing an embodiment of the third aspect of the invention, in particular illustrating the manifold component.
Figure 16A:
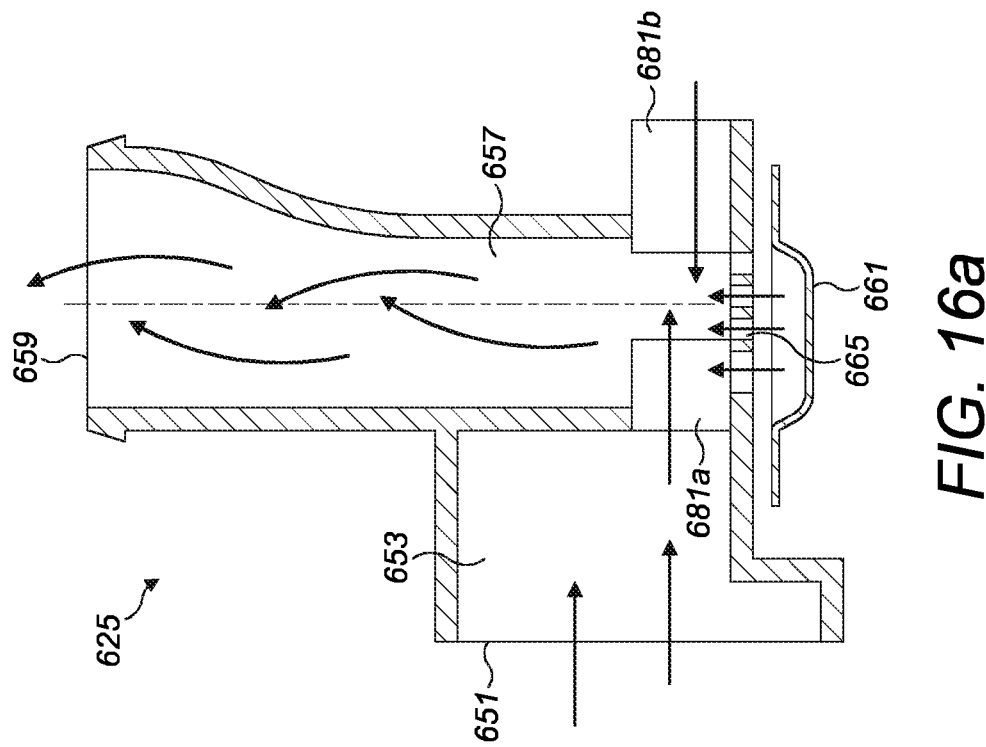

The third aspect of the invention will now be described. FIGS. 16*a* and 16*b* are views for describing a dry powder inhaler according to a non-limiting embodiment of the third aspect of the invention, in particular illustrating the manifold component 625. More particularly, FIG. 16*a* is a schematic cross-sectional view of the manifold component 625. FIG. 16*b* is a partial plan view of certain features of the manifold component 625.

The components of the dry powder inhaler other than the manifold component 625 are the same as those of the above-described embodiments of the first aspect of the invention, and will therefore not be described in any detail. The dry powder inhaler according to the third aspect of the invention therefore differs only in terms of the detailed design of the manifold component 625.

The manifold component 625 is, however, similar in terms of purpose and general structure to those of the manifold components 25, 325, 425 of the embodiments of the first aspect of the invention, but is not provided with an auxiliary air inlet opening 51*b* or an auxiliary air delivery conduit 53*b*, although such could in principle be provided. Thus, external air flows in to the manifold component 625 through a single air inlet opening 651. In use, the external air flows through an air delivery conduit 653 and, from there, into a medicament delivery conduit 657. The air passing through the medicament delivery conduit 657 entrains medicament from the blister pockets 661. The medicament-laden air then flows out through a medicament outlet opening 659, and is delivered to the user's mouth via the inhaler mouthpiece 5.

In this embodiment, the medicament delivery conduit 657 forms an elongated chamber having a substantially circular cross-sectional shape. First and second medicament inlet openings 665 are arranged at one end of the chamber 657, to be positioned over the respective opened blister pockets 661 for receiving medicament from the opened blister pockets 661. Only one of the blister pockets 661 and a corresponding one of the medicament inlet openings 665 are shown in FIG. 16*a*, although both medicament inlet openings 665 are shown in FIG. 16*b*. The medicament outlet opening 659 is arranged at the other end of the chamber 657.

According to this aspect of the invention, the manifold component 625 defines a pair of substantially spiral-shaped vanes 681*a*, 681*b* which are configured so that, in use of the inhaler, air from the external air inlet opening 651 flows transversely over the vanes 681*a*, 681*b* and is directed into the circular chamber 657 in directions that are substantially tangential to the chamber (see FIG. 16*b*) and at an axial position adjacent the medicament inlet openings 665. In this way, the tangential air flow forms a low pressure vortex in the bottom of the chamber 657 which is effective for drawing the medicament through the medicament inlet openings 665 and mixing the medicament with the air.

Thus, the air delivery conduit 653 effectively defines two tangential flow paths which are diametrically opposed to each other, and provide air to the chamber 657. Alternative embodiments may provide three or more tangential air flow paths for creating the low pressure vortex.

According to the third aspect of the invention, the need for air outlet openings for directing air into the opened blister pockets can be avoided, although such can still be provided in certain alternative embodiments. In particular, the low pressure vortex is sufficient for drawing out the medicament. When the air outlet openings are eliminated in this way, the risk of air and medicament leaking from the seal region between the opened blister pockets 661 and the manifold component 625 can be reduced. This leads to more consistent medicament dosing and may avoid wastage of medicament.

Figure 17:
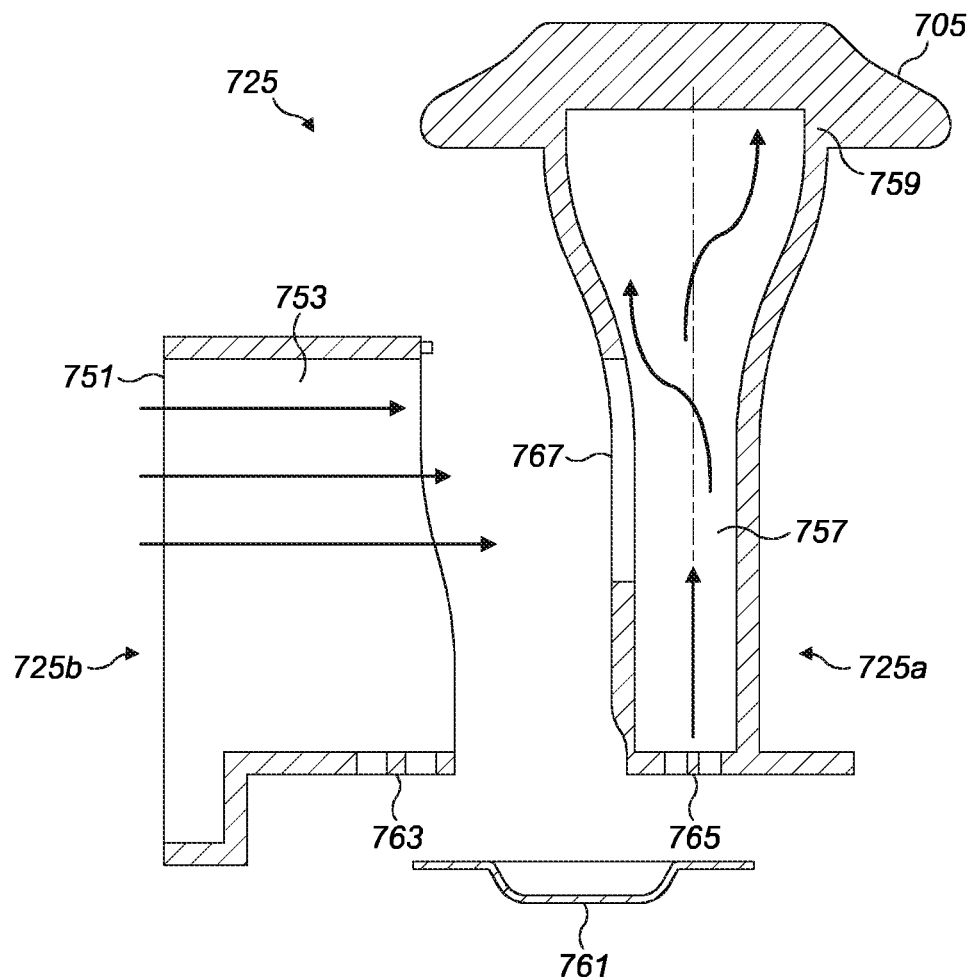
FIG. 17 is a schematic cross-sectional view for describing an embodiment of the fourth aspect of the invention, in particular illustrating the manifold assembly.

The fourth aspect of the invention will now be described with reference to FIG. 17, which is a schematic, exploded, cross-sectional view for describing a dry powder inhaler according to a non-limiting embodiment of this aspect. FIG. 17 illustrates a manifold assembly 725, which replaces both the manifold component and the separate mouthpiece component 5 of the other embodiments described above.

The components of the dry powder inhaler other than the manifold component/assembly and mouthpiece component are the same as those of the above-described embodiments of the first aspect of the invention, and will therefore not be described in any detail. The dry powder inhaler according to the fourth aspect of the invention therefore differs only in terms of the detailed design of the manifold assembly 725, including its mouthpiece 705.

The manifold assembly 725 is, however, similar in terms of purpose and general structure to those of the manifold components 25, 325, 425 of the embodiments of the first aspect of the invention, but is not provided with an auxiliary air inlet opening 51b or an auxiliary air delivery conduit 53b, although such could in principle be provided. Thus, external air flows in to the manifold assembly 725 through a single air inlet opening 751.

In use, the external air flows through an air delivery conduit 753 before it passes out of the manifold assembly 725, then through the opened blister pockets 761 where it entrains the medicament, back in to the manifold assembly 725, and along a medicament delivery conduit 757. The air-entrained medicament then flows through a medicament outlet opening 759, and is delivered to the user's mouth via a mouthpiece 705 of the manifold assembly 725.

In use, the air flows from the air delivery conduit 751 into the opened blister pockets 761 through first and second air outlet openings 763, one for each blister pocket. The medicament-laden air flows from the opened blister pockets 761 to the medicament delivery conduit 757 through first and second medicament inlet openings 765, one for each blister pocket. It should be noted that only one of the blister pockets, and a corresponding air outlet opening 763 and medicament inlet opening 765 are visible in FIG. 17, owing to the sectioning of the manifold assembly 725 in this drawing. However, the unillustrated openings have the same size and shape as the illustrated openings 763, 765, and are arranged to interface with a second one of the opened blister pockets.

A bypass opening 767 may be provided between the air delivery conduit 753 and the medicament delivery conduit 757 through which a portion of the external air drawn into the air inlet opening 751 may flow, as is known in the art for disruptively impacting the medicament-laden air flowing through the medicament delivery conduit 757.

According to this aspect of the invention, the medicament inlet opening 765, the medicament outlet opening 759 and the medicament delivery conduit 757 of the manifold assembly 725 are provided as a first unitary moulded plastics component 725a. The air inlet opening 751, the air outlet opening 763 and the air delivery conduit 753 of the manifold assembly 725 are provided as a second unitary moulded plastics component 725b, which is distinct from the first unitary component 725a.

In this way, the entire medicament flow path of the manifold assembly 725 can be provided as a unitary moulded plastics component, without any joins or seams through which the medicament could potentially leak. In this way, medicament leakage can be minimised. This can provide for more consistent medicament dosing, minimise medicament wastage, and avoid contamination of the internal mechanisms of the inhaler.

Design flexibility can be maintained by forming other parts of the manifold assembly 725, including the air delivery conduit 751, as the second unitary component 725b which is assembled or joined to the first component 725a by known techniques, such as by welding or through the use of integrated or separate fasteners. The assembling or joining of these components does not give rise to a risk of medicament leakage because the boundary between the components does not generally form a part of the medicament flow path. It should be noted that FIG. 17 illustrates the first and second unitary components 725a, 725b spaced-apart before being assembled, and the opened blister pocket 761 is illustrated in this drawing purely for explanatory purposes.

In the illustrated embodiment, the first unitary moulded plastics component 725a also defines the mouthpiece 705 of the inhaler, which contacts the user's mouth and through which the user is able to inhale the air-entrained medicament from the opened blister pocket 761. In this way, leakage of the medicament as it passes from the medicament delivery conduit 757 to the mouthpiece 705 can also be avoided.

Figure 18:
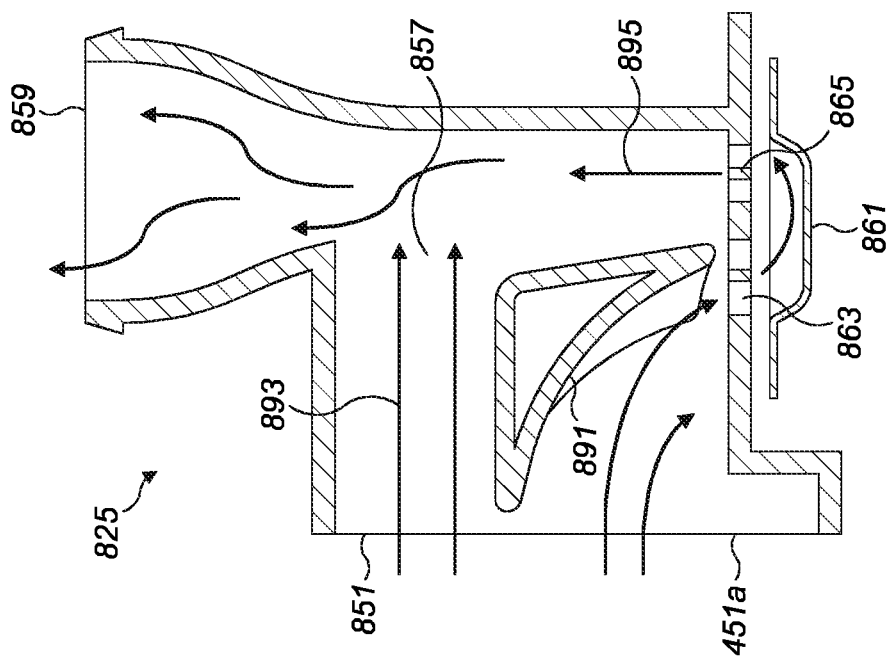
FIG. 18 is a schematic cross-sectional view for describing an embodiment of the fifth aspect of the invention, in particular illustrating the manifold component.

The fifth aspect of the invention will now be described with reference to FIG. 18, which is a schematic, cross-sectional view for describing a dry powder inhaler according to a non-limiting embodiment of this aspect. FIG. 18 illustrates the manifold component 825.

The components of the dry powder inhaler other than the manifold component 825 are the same as those of the above-described embodiments of the first aspect of the invention, and will therefore not be described in any detail. The dry powder inhaler according to the fifth aspect of the invention therefore differs only in terms of the detailed design of the manifold component 825.

The manifold component 825 is, however, similar in terms of purpose and general structure to those of the manifold components 25, 325, 425 of the embodiments of the first aspect of the invention, but is not provided with an auxiliary air inlet opening 51b or an auxiliary air delivery conduit 53b, although such could in principle be provided. Further, the manifold component 825 does not have an air delivery conduit that is separate from a medicament delivery conduit 857. Thus, external air flows in to the manifold component 825 through a single air inlet opening 851. In use, the external air flows through a medicament delivery conduit 857, and a portion of the air is directed through the opened blister pockets 861, so that the medicament is entrained in the air, before returning to the medicament delivery conduit 857.

In this embodiment, the medicament delivery conduit 857 forms a chamber, with the air inlet opening 851 and a medicament outlet opening 859 being arranged at opposite ends of the chamber 857. An air flow path extends from the air inlet opening 851 to the medicament outlet opening 859.

In use, the air flows from the medicament delivery conduit 857 into the opened blister pockets 861 through first and second air outlet openings 863, one for each blister pocket. The medicament-laden air flows from the opened blister pockets 861 back to the medicament delivery conduit 857 through first and second medicament inlet openings 865, one for each blister pocket. It should be noted that only one of the blister pockets, and a corresponding air outlet opening 863 and medicament inlet openings 865 are visible in FIG. 18, owing to the sectioning of the manifold assembly 825 in this drawing. However, the unillustrated openings have the same size and shape as the illustrated openings 863, 865, and are arranged to interface with a second one of the opened blister pockets.

The air outlet openings 863 and the medicament inlet openings 865 are arranged along the medicament delivery chamber 857, positioned between the air inlet opening 851 and the medicament outlet opening 859.

According to this aspect of the invention, the medicament delivery chamber 857 is provided with at least one deflection baffle 891 that is spaced away from the air outlet openings 863 and the medicament inlet openings 865. The deflection baffle 891 defines a surface that extends obliquely to the air flow path through the medicament delivery chamber 857 and is arranged to deflect a portion of the air flowing from the air inlet opening 851 to the medicament outlet opening 859 so that, in use of the inhaler, the deflected air is diverted through the opened blister pockets 861, via the air outlet openings 863 and the medicament inlet openings 865. The diverted air entrains the medicament in the opened blister pockets 861.

A portion of the air flow through the medicament delivery chamber 857 is not deflected by the baffle 891, and instead bypasses the opened blister pockets 861. This bypass airflow 893 disruptively impacts the medicament-laden air flowing from the opened blister pockets 861 to the medicament outlet opening 859, so as to help deagglomerate the powder medicament.

The deflection baffle 891, or a further baffle being spaced away from the air outlet openings 863 and the medicament inlet openings 865, may also be arranged to create a low pressure region 895 in the medicament delivery chamber 857, adjacent to the medicament inlet openings 865, for drawing the air-entrained medicament from the opened blister pockets 861, via the medicament inlet openings 865.

Figure 19:
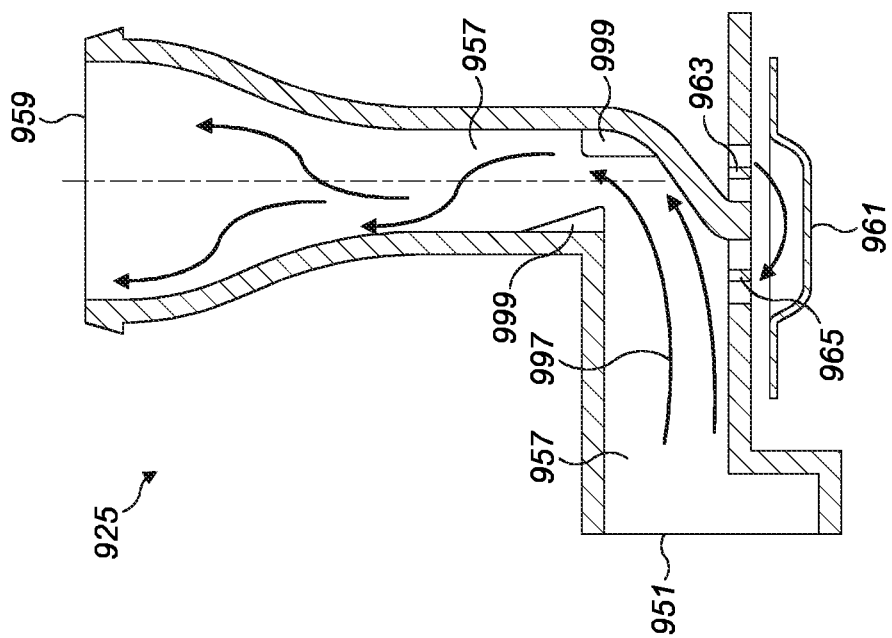
FIG. 19 is a schematic cross-sectional view for describing an embodiment of the sixth aspect of the invention, in particular illustrating the manifold component.

The sixth aspect of the invention will now be described with reference to FIG. 19, which is a schematic, cross-sectional view for describing a dry powder inhaler according to a non-limiting embodiment of this aspect. FIG. 19 illustrates the manifold component 925.

The components of the dry powder inhaler other than the manifold component 925 are the same as those of the above-described embodiments of the first aspect of the invention, and will therefore not be described in any detail. The dry powder inhaler according to the sixth aspect of the invention therefore differs only in terms of the detailed design of the manifold component 925.

The manifold component 925 is, however, similar in terms of purpose and general structure to those of the manifold components 25, 325, 425 of the embodiments of the first aspect of the invention, but is not provided with an auxiliary air inlet opening 51b or an auxiliary air delivery conduit 53b, although such could in principle be provided. Further, the manifold component 925 does not have any air delivery conduit that is separate from a medicament delivery conduit 957. Thus, external air flows in to the manifold component 925 through a single air inlet opening 951.

In this embodiment, a medicament delivery conduit 957 forms a chamber, with the air inlet opening 951 and a medicament outlet opening 959 being arranged at opposite ends of the chamber 957. An air flow path extends from the air inlet opening 951 to the medicament outlet opening 959.

The chamber 957 is provided with first and second medicament inlet openings 965, to be positioned over the respective opened blister pockets 961 for receiving medicament from the opened blister pockets 961. Only one of the blister pockets 961 and a corresponding one of the medicament inlet openings 965 are shown in FIG. 19. The medicament inlet openings 965 are arranged in a side wall of the chamber 957 between the air inlet opening 951 and the medicament outlet opening 959.

According to this aspect of the invention, the medicament inlet openings 965 are provided at a constricted section 997 of the medicament delivery conduit or chamber 959, such that, in use of the inhaler, the Venturi effect provides for a low pressure region 997 adjacent to the medicament inlet openings 965 for drawing the medicament from the opened blister pockets 961 into the medicament delivery conduit or chamber 959. The drawn in medicament is then entrained by the air flowing through the medicament delivery conduit or chamber 959.

In particular, the constricted section 997 of the medicament delivery conduit 957 defines a cross-sectional area that is at least 30%, optionally at least 50%, smaller than each of an upstream and downstream cross-sectional area of the medicament delivery conduit 957. In this way, the low pressure region 997 adjacent the medicament inlet openings 965 may be very effective for drawing the medicament from the opened blister pocket.

Such an arrangement may avoid the prior art requirement for the manifold component 925 to have an air outlet opening through which external air flows into the opened blister pockets. In particular, the low pressure region 997 effectively pulls the medicament from the blister pockets 961 and through the medicament inlet openings 965. Accordingly, the manifold component 925 may have no air outlet openings through which external air is able to flow into the opened blister pockets 961.

However, in the illustrated embodiment, the opened blister pockets 961 are exposed to a source of atmospheric pressure, being higher than a pressure at the low pressure region 997. For this purpose, the manifold component 925 may be provided with air outlet openings 963 fluidly connected to a source of atmospheric pressure, for example the interior of the inhaler housing. This atmospheric pressure being higher than the pressure of the low pressure region 997 helps to drive all of the medicament out of the opened blister pockets 961, without creating a significant air flow through the air outlet openings 963 and the opened blister pockets The medicament delivery conduit 957 of the illustrated embodiment is also provided with fins or baffles 999 downstream of the constricted section 997 for disrupting the airflow through the medicament delivery conduit 957, to thereby improve mixing of the air-entrained medicament. The fins or baffles 999 may be arranged at oblique angles for creating a vortex air flow.

As has been explained above, the dry powder inhaler according to the various aspects of the invention comprises two blister packs in the form of first and second blister packs 201a, 201b (FIG. 3). The dispensing mechanism is arranged to simultaneously open a blister pocket 61a, 61b of each of the first and second blister packs, and to simultaneously move the first and second blister packs 201a, 201b so that: the first opened blister pocket 61a is aligned with the first air outlet opening 63a and the first medicament inlet opening 65a; and the second opened blister pocket 61b is aligned with the second air outlet opening 63b and the second medicament inlet opening 65b. This allows the inhaler to be used for simultaneous inhalation of different medicaments from the opened blister pockets 61a, 61b.

Additionally or alternatively, the blister pockets 61a, 61b of the first and second blister packs 201a, 201b may have a different shape and/or volume. Additionally or alternatively, the pockets 61a, 61b of the first and second blister packs 201a, 201b may contain a different mass or volume of the respective medicaments, and/or contain respective medicaments having different particle size distributions.

The blister pockets 61a, 61b of the first and second blister packs 201a, 201b may contain different medicaments for simultaneous inhalation where is it preferred that the medicaments do not mix prior to delivery to the user, for example selected from budesonide, formoterol, beclomethasone, fluticasone, salmeterol, albuterol, salbutamol, indacaterol, tiotropium, ipratropium, glycorpyrronium or umeclidinium, vilanterol, and combinations thereof.

The different medicaments for simultaneous inhalation comprise:

LABA or SABA in the first blister pack and an ICS in the second blister pack; or LABA or SABA in the first blister pack and LAMA or SAMA in the second blister pack; or LABA or SABA and LAMA or SAMA in the first blister pack and ICS in the second blister pack, or budesonide in the first blister pack and formoterol in the second blister pack; or beclomethasone in the first blister pack and formoterol in the second blister pack; or fluticasone in the first blister pack and salmeterol in the second blister pack, or fluticasone in the first blister pack and albuterol in the second blister pack, or fluticasone in the first blister pack and vilanterol in the second blister pack, or umeclidinium in the first blister pack and vilanterol in the second blister pack, or two selected from umeclidinium, fluticasone and vilanterol in the first blister pack, the remaining medicament from umeclidinium, fluticasone and vilanterol in the second blister pack.

For example, the different medicaments for simultaneous inhalation comprise:

fluticasone furoate in the first blister pack and vilanterol trifenatate in the second blister pack, or umeclidinium bromide in the first blister pack and vilanterol trifenatate in the second blister pack, or two selected from umeclidinium bromide, fluticasone furoate and vilanterol trifenatate in the first blister pack and the remaining medicament from umeclidinium bromide, fluticasone furoate and vilanterol trifenatate in the second blister pack.

Non-limiting embodiments of the invention have been described hereinabove with reference to the accompanying drawings. Various changes may be made to these embodiments without departing from the scope of the invention, which is defined by the claims.

For example, the inhalers described hereinabove are for use with blister packs that are peeled open. However, the inhalers may be for use with blister packs that are opened in other ways, for example by piercing or bursting. The blister packs described above are in the form of elongate strips. In other embodiments, the blister packs may be in the form of discs having the blisters arranged about the circumference.

The embodiments described above comprise a specific type of delivery mechanism which is operated by opening a mouthpiece cover. Different types of delivery mechanism may be provided in alterative embodiment, for example, manual lever operated or electrically operated delivery mechanisms.

Although the inhaler described above comprise two medicament carriers, alternative embodiments of the invention may comprise a single medicament carrier, in which case only one half of the dispensing mechanism shown in FIGS. 3 and 4 would be need to be provided.

In this case, a single medicament carrier-containing embodiment of the invention may still be configured for simultaneous inhalation of different medicaments by configuring the dispensing mechanism to open two blisters at a time, and providing different blisters of the medicament carrier with different medicaments. For example, the different medicaments for simultaneous inhalation may comprise: budesonide in a first blister and formoterol in a second blister; or beclomethasone in a first blister and formoterol in a second blister; or fluticasone in a first blister and salmeterol in a second blister, or fluticasone in a first blister and albuterol in a second blister, or fluticasone in a first blister and vilanterol in a second blister, or umeclidinium in a first blister and vilanterol in a second blister, or two selected from umeclidinium, fluticasone and vilanterol in a first blister, the remaining medicament from umeclidinium, fluticasone and vilanterol in a second blister. The different medicaments (A and B) could be provided in successive blisters of the blister packs in a repeating arrangement, for example AB AB AB AB . . . or AB BA AB BA AB.

In this case, the manifold component would need to be adapted slightly, with the air outlet openings and the medicament inlet openings being arranged in the same side wall of the manifold component. This would be necessary to facilitate the interface between the manifold component and the first and second opened blister pockets when the first and second opened blister pockets are adjacent blister pockets in the same (single) blister pack.

Alternatively, the inhaler may comprise a single medicament carrier and be configured to open one blister pocket at a time, for delivery of a single medicament rather than combination therapy.

In the embodiments described above, the manifold component is a unitary (single piece) moulded plastics component. In alternative embodiments, the manifold component may be formed of multiple pieces that are assembled together, and/or may be formed of other materials, and/or may be formed by other processes, for example by machining a solid block of material.

The invention claimed is:

1. A dry powder inhaler for delivering medicament to a user from at least one blister pack, the at least one blister pack having a plurality of spaced-apart blister pockets containing doses of the medicament, the inhaler comprising:
a housing for accommodating unused and used portions of the at least one blister pack together with a dispensing mechanism for selectively opening the blister pockets; and
a manifold component through which air can be drawn in use of the inhaler, wherein the manifold component comprises:
an air inlet opening for receiving external air;
an air outlet opening for providing the external air from the air inlet opening into an opened blister pocket, the air inlet opening being fluidly connected to the air outlet opening by an air delivery conduit formed in the manifold component;
a medicament inlet opening for receiving air-entrained medicament from the opened blister pocket, the air outlet opening and the medicament inlet opening being arranged side-by-side to enable simultaneous communication with the opened blister pocket; and
a medicament outlet opening for delivery of the air-entrained medicament from the opened blister pocket to the user, the medicament inlet opening being fluidly connected to the medicament outlet opening by a medicament delivery conduit formed in the manifold component,
wherein the air outlet opening is arranged to be positioned substantially centrally over the opened blister pocket, and wherein the medicament inlet opening is arranged to be positioned over the opened blister pocket so as to be closer to an edge of the opened blister pocket than the air outlet opening.

2. The dry powder inhaler according to claim 1, wherein the medicament inlet opening at least partially surrounds the air outlet opening, optionally wherein the medicament inlet opening defines an angle of at least 180 degrees about the air outlet opening.

3. The dry powder inhaler according to claim 1, wherein the air outlet opening has a circular or elongate shape and/or the medicament inlet opening has a curved or arcuate shape.

4. The dry powder inhaler according to claim 1, wherein the medicament inlet opening is divided into a plurality of adjacent openings each arranged to be positioned over a peripheral region of the opened blister pocket.

5. The dry powder inhaler of claim 1, wherein the manifold component, or a unitary moulded plastics component of the manifold component, is formed of a material selected from the group consisting of:
polyolefins, including polyethylene, in particular high density polyethylene (HDPE), and polypropylene;
polyesters, including polyethylene terephthalate; polyamides, including nylons;
thermosetting polymers, including urea-formaldehyde, melamine, epoxy resins and polyimides; and
mixtures or copolymers thereof.

6. The dry powder inhaler of any preceding claim 1, wherein the air inlet opening defines a sole point of entry for external air into the manifold component, and optionally into the dry powder inhaler.

7. The dry powder inhaler of claim 1, wherein the dispensing mechanism is configured for opening at least two blister pockets of the plurality of spaced-apart blister pockets at a time, and wherein the manifold component further comprises a second air outlet opening for providing air to a second opened blister pocket and a second medicament inlet opening for receiving medicament from the second opened blister pocket, the second air outlet opening and the second medicament inlet opening being arranged side-by-side to enable simultaneous communication with the second opened blister pocket.

8. The dry powder inhaler of claim 1, further comprising the dispensing mechanism.

9. The dry powder inhaler according to claim 8, wherein the dispensing mechanism comprises a peeling mechanism arranged to open the blister pockets by peeling a cover layer of the at least one blister pack from a base layer of the at least one blister pack.

10. The dry powder inhaler according to claim 8, wherein the dispensing mechanism comprises an indexing mechanism arranged to move the at least one blister pack so that the opened blister pocket is aligned with the air outlet opening and the medicament inlet opening.

11. The dry powder inhaler of claim 1, further comprising the at least one blister pack, wherein the at least one blister pack comprises an elongate base layer defining the spaced-apart blister pockets containing the medicament doses, and a cover layer adhesively bonded to the base layer to close the blister pockets, and wherein the cover layer is arranged to be peeled from the base layer.

12. The dry powder inhaler of claim 11, wherein the blister pockets contain medicaments selected from budesonide, formoterol, beclomethasone, fluticasone, salmeterol, albuterol, salbutamol, indacaterol, tiotropium, ipratropium, glycorpyrronium, umeclidinium, vilanterol, and combinations thereof.

13. The dry powder inhaler of claim 1, further comprising the at least one blister pack, wherein the blister pockets contain different medicaments for simultaneous inhalation, the different medicaments being budesonide and formoterol.

14. The dry powder inhaler of claim 1, further comprising the at least one blister pack, wherein the blister pockets contain different medicaments for simultaneous inhalation, the different medicaments being budesonide and albuterol.

15. The dry powder inhaler of claim 1, further comprising the at least one blister pack, wherein the blister pockets contain different medicaments for simultaneous inhalation, the different medicaments being beclomethasone and formoterol.

16. The dry powder inhaler of claim 1, further comprising the at least one blister pack, wherein the blister pockets contain different medicaments for simultaneous inhalation, the different medicaments being beclomethasone, formoterol and glycopyrronium.

17. The dry powder inhaler of claim 1, further comprising the at least one blister pack, wherein the blister pockets contain different medicaments for simultaneous inhalation, the different medicaments being indacaterol and glycopyrronium.

18. The dry powder inhaler of claim 1, further comprising the at least one blister pack, wherein the blister pockets contain different medicaments for simultaneous inhalation, the different medicaments being fluticasone and albuterol.

19. The dry powder inhaler of claim 1, further comprising the at least one blister pack, wherein the blister pockets contain different medicaments for simultaneous inhalation, the different medicaments being fluticasone and salmeterol.

20. The dry powder inhaler of claim 1, further comprising the at least one blister pack, wherein the blister pockets contain different medicaments for simultaneous inhalation, the different medicaments being fluticasone and vilanterol.

21. The dry powder inhaler of claim 1, further comprising the at least one blister pack, wherein the blister pockets contain different medicaments for simultaneous inhalation, the different medicaments being vilanterol and umeclidinium.

22. The dry powder inhaler of claim 1, further comprising the at least one blister pack, wherein the blister pockets contain different medicaments for simultaneous inhalation, the different medicaments being fluticasone, vilanterol and umeclidinium.

23. The dry powder inhaler of claim 1, further comprising the at least one blister pack, wherein the blister pockets contain different medicaments for simultaneous inhalation, the different medicaments being glycopyrronium and formoterol.

24. The dry powder inhaler of claim 1, further comprising the at least one blister pack, wherein the blister pockets contain different medicaments for simultaneous inhalation, the different medicaments being glycopyrronium, formoterol and budesonide.

25. The dry powder inhaler of claim 1, further comprising the at least one blister pack, wherein the blister pockets contain different medicaments for simultaneous inhalation, the different medicaments being fluticasone and formoterol.

26. The dry powder inhaler of claim 1, further comprising the at least one blister pack, wherein the blister pockets contain different medicaments for simultaneous inhalation, the different medicaments being ipratropium and albuterol.

\* \* \* \* \*